US012770973B2

(12) United States Patent
Mun et al.

(10) Patent No.: US 12,770,973 B2
(45) Date of Patent: Oct. 20, 2026

(54) SEPARATOR FOR LITHIUM SECONDARY BATTERY AND METHOD FOR MANUFACTURING THE SAME

(71) Applicant: LG Chem, Ltd., Seoul (KR)

(72) Inventors: Sung Cik Mun, Daejeon (KR); Joo-Sung Lee, Daejeon (KR); Sung-Jae Han, Daejeon (KR)

(73) Assignee: LG Chem, Ltd., Seoul (KR)

( * ) Notice: Subject to any disclaimer, the term of this patent is extended or adjusted under 35 U.S.C. 154(b) by 755 days.

(21) Appl. No.: 18/033,735

(22) PCT Filed: Nov. 11, 2021

(86) PCT No.: PCT/KR2021/016475
§ 371 (c)(1),
(2) Date: Apr. 25, 2023

(87) PCT Pub. No.: WO2022/103184
PCT Pub. Date: May 19, 2022

(65) Prior Publication Data
US 2023/0402709 A1 Dec. 14, 2023

(30) Foreign Application Priority Data
Nov. 11, 2020 (KR) ........................ 10-2020-0150262

(51) Int. Cl.
*H01M 50/403* (2021.01)
*C08K 3/013* (2018.01)
(Continued)

(52) U.S. Cl.
CPC ........... *H01M 50/403* (2021.01); *C08K 3/013* (2018.01); *C09J 9/00* (2013.01); *H01M 10/052* (2013.01);
(Continued)

(58) Field of Classification Search
CPC ............. H01M 50/403; H01M 50/417; H01M 50/44; H01M 50/461; H01M 50/491;
(Continued)

(56) References Cited

U.S. PATENT DOCUMENTS

2001/0005563 A1 6/2001 Yamamoto et al.
2009/0170005 A1 7/2009 Kimishima et al.
(Continued)

FOREIGN PATENT DOCUMENTS

EP 3866219 A1 8/2021
EP 3878898 A1 9/2021
(Continued)

OTHER PUBLICATIONS

International Search Report for PCT/KR2021/016475 mailed Feb. 25, 2022. 3 pgs.
Extended European Search Report including Written Opinion for Application No. 21892351.4 dated Nov. 25, 2024. 9 pages.

*Primary Examiner* — Karie O'neill Apicella
(74) *Attorney, Agent, or Firm* — Lerner David LLP

(57) ABSTRACT

A separator for a lithium secondary battery, a method of making the same, and a lithium secondary battery including the same is disclosed herein. In some embodiments, a separator for a lithium secondary battery including a porous polyolefin substrate having a tan(δ) of 0.3 or less. The tan(δ) is determined by Formula 1 at a temperature of 230° C. and an angular frequency of 0.1 rad/s:

$$\tan(\delta)=G''/G' \quad \text{[Formula 1]}$$

wherein G' is a storage modulus of the polyolefin and G" is a loss modulus of the polyolefin. The separator has a low viscosity but high elasticity at high temperature, maintains strength at high temperature, and has resis-
(Continued)

1 tance against external force at high temperature. A lithium secondary battery including the separator has improved safety.

19 Claims, 3 Drawing Sheets

(51) Int. Cl.

| | |
|---|---|
| ***C09J 9/00*** | (2006.01) |
| ***H01M 10/052*** | (2010.01) |
| ***H01M 50/417*** | (2021.01) |
| ***H01M 50/431*** | (2021.01) |
| ***H01M 50/44*** | (2021.01) |
| ***H01M 50/446*** | (2021.01) |
| ***H01M 50/451*** | (2021.01) |
| ***H01M 50/46*** | (2021.01) |
| ***H01M 50/491*** | (2021.01) |

(52) U.S. Cl.
CPC ....... *H01M 50/417* (2021.01); *H01M 50/431* (2021.01); *H01M 50/44* (2021.01); *H01M 50/446* (2021.01); *H01M 50/451* (2021.01); *H01M 50/461* (2021.01); *H01M 50/491* (2021.01)

(58) Field of Classification Search
CPC ............. H01M 50/446; H01M 50/451; H01M 50/431; H01M 10/052; C08K 3/013; C09K 9/00
See application file for complete search history.

(56) References Cited

U.S. PATENT DOCUMENTS

| | | | | |
|---|---|---|---|---|
| 2017/0047570 | A1 | 2/2017 | Sawada et al. | |
| 2020/0220139 | A1 | 7/2020 | Lee et al. | |
| 2020/0335755 | A1* | 10/2020 | Zhang ................. | H01M 50/406 |
| 2020/0343506 | A1* | 10/2020 | Kim .................... | H01M 50/449 |
| 2021/0214535 | A1 | 7/2021 | Yamashita et al. | |
| 2022/0407179 | A1* | 12/2022 | Han .................... | H01M 50/417 |

FOREIGN PATENT DOCUMENTS

| | | | | |
|---|---|---|---|---|
| EP | 4040589 | A1 | 8/2022 | |
| JP | 2002134091 | A | 5/2002 | |
| JP | 200866193 | A | 3/2008 | |
| JP | 2008-115264 | A | 5/2008 | |
| JP | 2008-222913 | A | 9/2008 | |
| JP | 200970620 | A | 4/2009 | |
| JP | 4791002 | B2 | 10/2011 | |
| JP | 2017203145 | A | 11/2017 | |
| JP | WO2020096061 | A1 | 2/2021 | |
| KR | 100852558 | B1 | 8/2008 | |
| KR | 20150071378 | A | 6/2015 | |
| KR | 102037343 | B1 | 10/2019 | |
| KR | 20200012110 | A | 2/2020 | |
| KR | 20200012800 | A | 2/2020 | |
| KR | 20200062292 | A | 6/2020 | |
| KR | 20200106880 | A | 9/2020 | |
| KR | 20200109631 | A | 9/2020 | |
| KR | 20200125870 | A | 11/2020 | |
| WO | 2015-166949 | A1 | 11/2015 | |
| WO | 2020-179101 | A1 | 9/2020 | |
| WO | WO-2021091330 | A1 * | 5/2021 | .......... H01M 50/491 |

* cited by examiner

SEPARATOR FOR LITHIUM SECONDARY BATTERY AND METHOD FOR MANUFACTURING THE SAME

CROSS-REFERENCE TO RELATED APPLICATIONS

The present application is a national phase entry under 35 U.S.C. § 371 of International Application No. PCT/KR2021/016475, filed on Nov. 11, 2021, which claims priority to Korean Patent Application No. 10-2020-0150262 filed on Nov. 11, 2020 in the Republic of Korea, the disclosures of which are incorporated herein by reference.

TECHNICAL FIELD

The present disclosure relates to a separator for a lithium secondary battery and a method for manufacturing the same. Particularly, the present disclosure relates to a separator for a lithium secondary battery which maintains elasticity even at high temperature and a method for manufacturing the same.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused.

Among the commercially available secondary batteries, lithium secondary batteries developed in the early 1990's have been spotlighted, since they have a higher operating voltage and significantly higher energy density as compared to conventional batteries, such as Ni-MH, Ni—Cd and sulfuric acid-lead batteries using an aqueous electrolyte.

Such a lithium secondary battery includes a positive electrode, a negative electrode, an electrolyte and a separator. Particularly, it is required for the separator to have insulation property for separating and electrically insulating the positive electrode and the negative electrode from each other and high ion conductivity for increasing lithium ion permeability based on high porosity.

Meanwhile, there is a need for remarkable improvement of the safety and cost of lithium secondary batteries in order to apply the lithium secondary batteries to electric vehicles (EV).

In the case of a typical polyolefin separator, a polyethylene (PE) separator, it has a low melting point (Tm) and may cause ignition and explosion, when a battery is used abnormally, and the battery temperature may be increased to the melting point of polyethylene or higher to generate a meltdown phenomenon, resulting in ignition and explosion.

As a method for reinforcing the safety of a separator, there has been an attempt to use a PE/PP/PE trilayer separator by blending polypropylene (PP) having a relatively higher melting point as compared to polyethylene, instead of a polyethylene monolayer separator. Such a PE/PP/PE trilayer separator is advantageous in that it shows an increased meltdown temperature as compared to the polyethylene monolayer separator, but shows a limitation in that it requires a more complicated manufacturing process as compared to the wet monolayer polyethylene separator. In addition, as another method for reinforcing the safety of a separator, there has been an attempt to form crosslinked bonds in polyethylene fibrils by using a crosslinking agent. However, the method shows low processing efficiency due to the production of byproducts and causes formation of undesired foreign materials in a separator.

DISCLOSURE

Technical Problem

The present disclosure is designed to solve the problems of the related art, and therefore the present disclosure is directed to providing a separator maintaining elasticity even at high temperature and an electrochemical device including the same.

In addition, when the separator maintains elasticity at high temperature, it ensures resistance against external force in the state of high-temperature exposure, and thus can ensure the safety of an electrochemical device.

Technical Solution

In one aspect of the present disclosure, there is provided a separator for a lithium secondary battery according to any one of the following embodiments.

According to the first embodiment, there is provided a separator for a lithium secondary battery including a porous polyolefin substrate having a tan(δ) of 0.3 or less as determined by the following Formula 1 at a temperature of 230° C. and an angular frequency of 0.1 rad/s:

$$\tan(\delta) = \text{loss modulus } G''/\text{storage modulus } G' \quad \text{[Formula 1]}$$

wherein G' is a storage modulus of the porous polyolefin substrate and G" is a loss modulus of the porous polyolefin substrate.

According to the second embodiment, there is provided the separator for a lithium secondary battery as defined in the first embodiment, wherein Formula 1, when computed over a range of angular frequencies, can be used to generate a gradient of storage-loss modulus curve, where the horizontal axis of which is the storage modulus G' and the vertical axis of which is the loss modulus G".

According to the third embodiment, there is provided the separator for a lithium secondary battery as defined in the first or the second embodiment, wherein the porous polyolefin substrate has a tan(δ) of 0.1-0.3.

According to the fourth embodiment, there is provided the separator for a lithium secondary battery as defined in any one of the first to the third embodiments, wherein porous polyolefin substrate has an 'a' value of 0.03-0.25 as determined by the following Formula 2 a temperature of 230° C. and an angular frequency of 0.1 rad/s:

$$a = d(\log(G'))/d(\log(\text{angular frequency})). \quad \text{[Formula 2]}$$

According to the fifth embodiment, there is provided the separator for a lithium secondary battery as defined in any one of the first to the fourth embodiments, wherein Formula 2, when computed over a range of angular frequencies, can be used to generate a gradient of frequency-storage modulus curve, where the horizontal axis of which is the angular frequency, converted into a log scale, and the vertical axis of which is the storage modulus G', converted into a log scale.

According to the sixth embodiment, there is provided the separator for a lithium secondary battery as defined in any one of the first to the fifth embodiments, wherein 'a' value of Formula 2 is 0.04-0.23.

According to the seventh embodiment, there is provided the separator for a lithium secondary battery as defined in any one of the first to the sixth embodiments, wherein the porous polyolefin substrate includes a plurality of fibrils and pores, wherein the pores are formed by the fibrils entangling with one another, and polyolefin chains forming the fibrils are crosslinked directly with one another.

According to the eighth embodiment, there is provided the separator for a lithium secondary battery as defined in the seventh embodiment, wherein the surfaces of fibrils are crosslinked.

According to the ninth embodiment, there is provided the separator for a lithium secondary battery as defined in any one of the first to the eighth embodiments, wherein the storage modulus (G') is $1.0\times10^5$ to $1.0\times10^7$ Pa.

According to the tenth embodiment, there is provided the separator for a lithium secondary battery as defined in any one of the first to the ninth embodiments, wherein the loss modulus (G') is 1.0×10 6 Pa or less.

According to the eleventh embodiment, there is provided the separator for a lithium secondary battery as defined in any one of the first to the tenth embodiments, where the separator has a melt-down temperature of 160° C. or higher.

According to the twelfth embodiment, there is provided the separator for a lithium secondary battery as defined in any one of the first to the eleventh embodiments, where the separator has a porosity of 40% or more.

According to the thirteenth embodiment, there is provided the separator for a lithium secondary battery as defined in any one of the first to the twelfth embodiments, where the separator has an air permeability of 500 sec/100 mL or less.

According to the fourteenth embodiment, there is provided the separator for a lithium secondary battery as defined in any one of the first to the thirteenth embodiments, where the separator has a melt-down temperature of 160° C. or higher and a porosity of 40% or more.

According to the fifteenth embodiment, there is provided the separator for a lithium secondary battery as defined in any one of the first to the fourteenth embodiments, which further includes an inorganic composite porous layer disposed on at least one surface of the porous polyolefin substrate, and wherein the inorganic composite porous layer contains an inorganic filler and a binder polymer.

According to the sixteenth embodiment, there is provided the separator for a lithium secondary battery as defined in any one of the first to the fifteenth embodiments, which further includes:

- an inorganic composite porous layer disposed on at least one surface of the porous polyolefin substrate, wherein the inorganic composite porous layer contains an inorganic filler and a first binder polymer; and
- a porous adhesive layer disposed on the inorganic composite porous layer, wherein the porous adhesive layer contains a second binder polymer.

In another aspect of the present disclosure, there is provided a method for manufacturing a separator for a lithium secondary battery according to any one of the following embodiments.

According to the seventeenth embodiment, there is provided a method for manufacturing the separator for a lithium secondary battery as defined in any one of the first to the sixteenth embodiments, including the steps of:

- (S1) preparing a non-crosslinked porous polyolefin substrate;
- (S2) applying a photoinitiator composition including a Type 2 photoinitiator to the non-crosslinked polyolefin porous substrate, wherein the photoinitiator composition includes a Type 2 photoinitiator; and
- (S3) irradiating the non-crosslinked porous polyolefin substrate having the applied photoinitiator composition, where the irradiation uses ultraviolet (UV) rays.

According to the eighteenth embodiment, there is provided the method for manufacturing the separator for a lithium secondary battery as defined in the seventeenth embodiment, wherein the non-crosslinked porous polymer substrate in step (S1) has a BET specific surface area of 15 $m^2/g$ or more.

According to the nineteenth embodiment, there is provided the method for manufacturing the separator for a lithium secondary battery as defined in the seventeenth or the eighteenth embodiment, wherein the non-crosslinked porous polyolefin substrate of step (S1) has a tan(δ) of 0.5 or more, as determined by Formula 1 at a temperature of 230° C. and an angular frequency of 0.1 rad/s.

According to the twentieth embodiment, there is provided the method for manufacturing the separator for a lithium secondary battery as defined in any one of the seventeenth to the nineteenth embodiments, wherein the Type 2 photoinitiator includes isopropyl thioxanthone (ITX), an isopropyl thioxanthone derivative, thioxanthone (TX), benzophenone (BPO), a benzophenone derivative, 4-hydroxybenzophenone, or two or more of them.

According to the twenty-first embodiment, there is provided the method for manufacturing the separator for a lithium secondary battery as defined in any one of the seventeenth to the nineteenth embodiments, wherein the concentration of the Type 2 photoinitiator in the Type 2 photoinitiator composition is 0.01-0.3 wt %, based on the total weight of the photoinitiator composition.

According to the twenty-second embodiment, there is provided the method for manufacturing the separator for a lithium secondary battery as defined in any one of the seventeenth to the twenty-first embodiments, wherein the Type 2 photoinitiator composition in step (S2) further includes a Type 1 photoinitiator.

According to the twenty-third embodiment, there is provided the method for manufacturing the separator for a lithium secondary battery as defined in the twenty-second embodiment, wherein the Type 1 photoinitiator includes a benzoin-based initiator, a hydroxyketone-based initiator, an aminoketone-based initiator, a phosphine oxide-based initiator, or two or more of them.

According to the twenty-fourth embodiment, there is provided a lithium secondary battery including a positive electrode, a negative electrode and a separator interposed between the positive electrode and the negative electrode, wherein the separator is the separator for a lithium secondary battery as defined in any one of the first to the sixteenth embodiments.

Advantageous Effects

According to an embodiment of the present disclosure, it is possible to provide a separator including polyolefin having low viscosity and high elasticity at high temperature. In this manner, it is possible to provide a lithium secondary battery which maintains the strength of the separator at high temperature, ensures sufficient resistance against external force in the state of high-temperature exposure, and thus shows improved safety.

According to an embodiment of the present disclosure, it is possible to obtain a crosslinked polyolefin separator through a simplified process, unlike the process according to the related art. Particularly, polyolefin as a main ingredient of the separator is crosslinked simply and effectively to provide a separator with high elasticity as compared to viscosity. In this manner, the separator causes melt-down at a higher temperature as compared to polyolefin before crosslinking, and thus can provide enhanced heat resistance.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
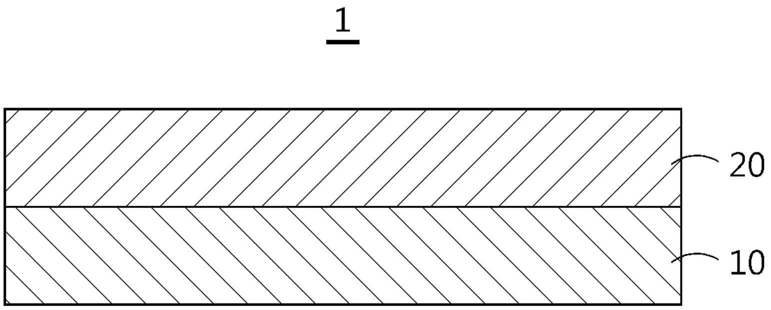
FIG. 1 is a schematic view illustrating the separator for a lithium secondary battery according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

As used herein, the expression 'one portion is connected to another portion' covers not only 'a portion is directly connected to another portion' but also 'one portion is connected electrically to another portion' by way of the other element interposed between them. The connection includes not only physical connection but also electrochemical connection.

Throughout the specification, the expression 'a part includes an element' does not preclude the presence of any additional elements but means that the part may further include the other elements.

In addition, it will be understood that the terms 'comprises' and/or 'comprising', or 'includes' and/or 'including' when used in this specification, refer to the presence of any stated shapes, numbers, steps, operations, members, elements and/or groups thereof, but do not preclude the addition of one or more other shapes, numbers, steps, operations, members, elements and/or groups thereof.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression 'A and/or B' means 'A, B or both of them'.

In one aspect, the present disclosure relates to a separator for a lithium secondary battery and a method for manufacturing the same.

A separator used for a lithium secondary battery shows excellent safety, when the interval between its shutdown temperature and meltdown temperature is large. To broaden the interval between the shutdown temperature and meltdown temperature, it is required that the shutdown temperature is controlled to be decreased and the meltdown temperature is controlled to be increased.

As a method for reinforcing the safety of a separator, there has been an attempt to use a PE/PP/PE trilayer separator by blending polypropylene (PP) having a relatively higher melting point as compared to polyethylene, instead of a polyethylene monolayer separator. Such a PE/PP/PE trilayer separator is advantageous in that it shows an increased meltdown temperature as compared to the polyethylene monolayer separator, but shows a limitation in that it requires a more complicated manufacturing process as compared to the wet monolayer polyethylene separator. In addition, as another method for reinforcing the safety of a separator, there has been an attempt to form crosslinked bonds in polyethylene fibrils by using a crosslinking agent. However, the method shows low processing efficiency due to the production of byproducts and causes formation of undesired foreign materials in a separator.

Under these circumstances, according to the present disclosure, polyolefin is crosslinked by a method different from the conventional methods to enhance its rheological elasticity significantly. According to the present disclosure, elasticity is increased as compared to viscosity to increase the temperature where melt-down occurs. In this manner, it is possible to improve the safety of a battery at high temperature. Particularly, polyolefin as a main ingredient of a separator can be crosslinked simply and effectively to provide a separator having high elasticity as compared to viscosity.

In one aspect of the present disclosure, there is provided a separator for a lithium secondary battery including a porous polyolefin substrate having a tan(δ) of 0.3 or less as determined by the following Formula 1 at a temperature of 230° C. and an angular frequency of 0.1 rad/s:

$$\tan(\delta) = \text{loss modulus } G''/\text{storage modulus } G' \quad \text{[Formula 1]}$$

The present inventors have conducted intensive studies to provide a crosslinked polyolefin separator which ensures safety even at high temperature. As a means for solving the technical problem, it is intended to reduce the viscosity of the separator and to increase the elasticity thereof at high temperature so that the separator may have improved high-temperature safety.

Particularly, when the viscosity of the separator is reduced and the elasticity thereof in increased at high temperature, the separator maintains its strength at high temperature and the separator itself shows no flowability, and thus a short-circuit between a positive electrode and a negative electrode can be prevented, resulting in improvement of the safety of the separator.

According to an embodiment of the present disclosure, Formula 1, when computed over a range of angular frequencies, can be used to generate a gradient of storage-loss modulus curve, where the horizontal axis of which is the storage modulus G', and the vertical axis of which is the loss modulus G".

In the storage-loss modulus curve, it is possible to provide a separator having improved safety, when G' is larger than G", particularly, when tan(δ) is 0.3 or less at a temperature of 230° C. and an angular frequency of 0.1 rad/s. When tan(δ) is larger than 0.3, the separator shows higher viscosity as compared to elasticity and may be broken at high temperature with ease, resulting in a risk of battery ignition caused by a short circuit between a positive electrode and a negative electrode.

According to the present disclosure, storage modulus G' means the ability of an energy-storing material and may be represented by the following Formula 3:

$$G' = (\text{stress}/\text{strain})\cos\delta \qquad \text{[Formula 3]}$$

According to an embodiment of the present disclosure, the storage modulus may be determined by using a rheological property analyzer (ARES-G2, TA Instrument).

According to an embodiment of the present disclosure, the storage modulus may be determined by using a rheological property analyzer (ARES-G2, TA Instrument) through a frequency sweep test in a linear viscoelastic regime at a temperature of 230° C. and at a frequency of 0.1 rad/s. However, the whole range of 0.1-100 rad/s may be plotted in a graph.

According to an embodiment of the present disclosure, the storage modulus may be $1.0\times10^5$ to $1.0\times10^7$ Pa, $1.0\times10^5$ or more, $2.0\times10^5$ Pa or more, $5.0\times10^5$ Pa or more, and 2.0×10 6 Pa or less, 5.0×10 6 Pa or less, or $1.0\times10^7$ Pa or less at a temperature of 230° C. and at a frequency of 0.1 rad/s. When the storage modulus is within the above-defined range, there is an advantage in that the separator maintains its strength at high temperature.

According to an embodiment of the present disclosure, loss modulus G" means the ability of a material which loses energy upon deformation and may be represented by the following Formula 4:

$$G'' = (\text{stress}/\text{strain})\sin\delta \qquad \text{[Formula 4]}$$

According to an embodiment of the present disclosure, the loss modulus may be determined by using a rheological property analyzer (ARES-G2, TA Instrument).

According to an embodiment of the present disclosure, the loss modulus may be determined by using a rheological property analyzer (ARES-G2, TA Instrument) through a frequency sweep test in a linear viscoelastic regime at a temperature of 230° C. and at a frequency of 0.1 rad/s. However, the whole range of 0.1-100 rad/s may be plotted in a graph.

According to an embodiment of the present disclosure, the loss modulus may be 1.0×10 6 Pa or less, 1.0×10 4 Pa or more, or 2.0×10 4 Pa or more, and $3.0\times10^5$ Pa or less, or $1.0\times10^5$ Pa or less at a temperature of 230° C. and at a frequency of 0.1 rad/s. When the loss modulus is within the above-defined range, there is an advantage in that the separator shows no flowability.

According to the present disclosure, the meaning of tan(δ) is a relative measure of elasticity contribution as compared to viscosity contribution. Particularly, when the ratio is 1 or more, the separator shows properties similar to the properties of a liquid. On the other hand, when the ratio is 1 or less, the separator shows properties similar to the properties of a solid.

Particularly, a smaller value of tan(δ) means a higher storage modulus as compared to loss modulus and a higher melt-down temperature.

According to the present disclosure, in such a range that the separator shows a frequency of 0.1 rad/s, the ratio of loss modulus G" of the separator to the storage modulus G' thereof. i.e. tan(δ) is 0.3 or less. According to an embodiment of the present disclosure, tan(δ) may be 0.1 or more, 0.14 or more, 0.17 or more, 0.18 or more, or 0.23 or more, and 0.17 or less, 0.18 or less, 0.23 or less, 0.25 or less, or 0.3 or less. When tan(δ) satisfies the above-defined range, there is an advantage in that the separator can retain its insulating function, while maintaining its strength.

According to an embodiment of the present disclosure, the polyolefin contained in the separator shows an 'a' value of 0.03-0.25 as determined by the following Formula 2 at a temperature of 230° C. and an angular frequency of 0.1 rad/s:

$$a = d(\log(G'))/d(\log(\text{angular frequency})) \qquad \text{[Formula 2]}$$

Herein, Formula 2, when computed over a range of angular frequencies, can generate a gradient of frequency-storage modulus curve, the horizontal axis of which is the angular frequency of the porous polyolefin substrate, converted into a log scale, and the vertical axis of which is storage modulus G', converted into a log scale.

Herein, reference will be made to the above description about the storage modulus.

According to an embodiment of the present disclosure, 'a' value may be 0.03-0.25, 0.04-0.23, 0.05-0.23, 0.09-0.23, 0.09-0.19, 0.05-0.15, or 0.19-0.23 under such a UV crosslinking condition that the separator ensures stability to improve the elasticity thereof suitably, while preventing degradation of the mechanical properties, such as elongation property, caused by excessive crosslinking. In addition, 'a' value may be 0.03 or more, or more, 0.05 or more, 0.09 or more, or 0.19 or more, and 0.15 or less, 0.19 or less, or less, or 0.25 or less. When 'a' value falls within the above-defined range of 0.03-0.25, there is an advantage in that the separator may retain a function as an insulator at high temperature.

According to an embodiment of the present disclosure, the separator includes a plurality of fibrils and pores formed by the fibrils entangled with one another, and polyolefin chains forming the fibrils may be crosslinked directly with one another. Herein, the separator may be crosslinked by UV.

Herein, 'fibril' refers to one formed through the longitudinal elongation and orientation of the polymer chains forming a polyolefin porous substrate during the manufacture of the porous substrate so that the binding force between the adjacent molecular chains may be increased and the chains may be assembled in the longitudinal direction. As a result, the crosslinked polyolefin porous substrate according to the present disclosure has a layered structure including a plurality of fibrils aligned in parallel with the substrate surface.

Herein, the expression 'crosslinked directly (direct crosslinking)' refers to a state of direct crosslinking between the polyolefin chains forming the fibrils substantially including polyolefin (preferably, fibrils consisting of polyolefin alone), after the fibrils are provided with reactivity by the addition of a Type 2 photoinitiator. Therefore, crosslinking occurring between an additional crosslinking agent introduced thereto and the polyolefin chains does not correspond to 'direct crosslinking'.

The term 'direct crosslinking' refers to crosslinking accomplished by a Type 2 photoinitiator.

It is generally known that photoinitiators are classified into Type 1 photoinitiators and Type 2 photoinitiators.

The Type 1 photoinitiator undergoes unimolecular bond cleavage after absorbing light, and then is converted into reactive species. The Type 1 photoinitiator does not require any other chemical species for its function. It is known that when carrying out crosslinking of polyolefin (e.g. polyethylene) chains by using the Type 1 photoinitiator and a curing agent, the initiator or the curing agent is bound to radicals generated from the polyethylene chains, resulting in crosslinking.

On the contrary, it is known that the Type 2 photoinitiator undergoes bimolecular reaction, and reacts with another molecule (e.g. co-initiator or synergist) after absorbing light to form a reactive compound.

However, even though the Type 2 photoinitiator is used according to the present disclosure, it forms radicals and is converted into a reactive compound, while hydrogen atoms are removed through hydrogen abstraction merely by light absorption with no aid of another co-initiator or synergist, and allows conversion of polyolefin itself into reactive polyolefin. Therefore, according to an embodiment of the present disclosure, it is possible to provide a crosslinked polyolefin porous substrate which includes polyolefin chains of fibrils formed of polyolefin compounds crosslinked directly. In this case, the polyolefin porous substrate may retain its pore structure before direct crosslinking, as it is, even after direct crosslinking. Therefore, it is possible to provide improved thermal safety.

The separator according to an embodiment of the present disclosure is crosslinked directly by UV, wherein the crosslinking may be surface crosslinking occurring directly merely on the surfaces of fibrils of polyolefin contained in the separator. On the other hand, the conventional silane aqueous crosslinking caused by silane is crosslinking occurring even to the inside of the fibrils, which is different from the crosslinking method according to the present disclosure. For example, when UV crosslinking is applied onto a polyolefin substrate having little or no pores, the crosslinking rate is decreased significantly.

The separator according to an embodiment of the present disclosure may have a UV crosslinking structure derived from use of a Type 2 photoinitiator alone, a UV crosslinking structure derived from combined use of a Type 2 photoinitiator with a Type 1 photoinitiator, a UV crosslinking structure derived from combined use of a Type 2 photoinitiator with an ethylenically unsaturated bond-containing multifunctional monomer, or a UV crosslinking structure derived from combined use of a Type 2 photoinitiator, Type 1 photoinitiator and an ethylenically unsaturated bond-containing multifunctional monomer. Herein, the UV crosslinking structure derived from use of a Type 2 photoinitiator alone and the UV crosslinking structure derived from combined use of a Type 2 photoinitiator with a Type 1 photoinitiator are structures crosslinked directly between the polyolefin chains forming the fibrils of the separator as mentioned above. Meanwhile, the UV crosslinking structure derived from use of a Type 2 photoinitiator alone, or the UV crosslinking structure derived from combined use of a Type 2 photoinitiator, Type 1 photoinitiator and an ethylenically unsaturated bond-containing multifunctional monomer may form a structure in which the ethylenically unsaturated bond-containing multifunctional monomer surrounds the fibrils of polyolefin to cause self-crosslinking and coating of the outside of the fibrils with the resultant crosslinked polymer, as well as includes a structure crosslinked directly between the polyolefin chains forming the fibrils of the separator. When the separator further includes the crosslinking structure derived from the self-polymerization of ethylenically unsaturated bond-containing multifunctional monomer in addition to the directly crosslinked structure, the separator may have a firmer crosslinking structure and show a further increased melt-down temperature, and thus can ensure sufficient resistance against external force in the state of high-temperature exposure to provide further improved safety.

Particular examples of the ethylenically unsaturated bond-containing multifunctional monomer include, but are not limited to: compounds obtained by esterification of a polyhydric alcohol with β-unsaturated carboxylic acid, such as tris(2-hydroxyethyl) isocyanurate triacrylate (TEICTA), ethylene glycol diacrylate, ethylene glycol dimethacrylate, polyethylene glycol diacrylate or polyethylene glycol dimethacrylate having a number of ethylene groups of 2-14, trimethylolpropane acrylate, trimethylolpropane trimethacryalte, pentaerythritol triacrylate, pentaerythritol trimethacryalte, pentaerythritol tetraacrylate, pentaerythritol tetramethacrylate, propylene glycol diacarylate or propylene glycol dimethacryalte having a number of propylene groups of 2-14, dipentaerythritol pentaacrylate, dipentaerythritol pentamethacryalte, dipentaerythritol hexaacrylate, dipentaerythritol hexamethacrylate, or the like; compounds obtained by adding acrylic acid or methacrylic acid to a glycidyl group-containing compound, such as trimethylolpropane triglycidyl ether-acrylic acid adduct, bisphenol A diglycidyl ether-acrylic acid adduct, or the like; and an esterified compound of a hydroxyl group- or ethylenically unsaturated bond-containing compound with polyhydric carboxylic acid or adduct with polyisocyanate, such as phthalate of β-hydroxyethyl acrylate or β-hydroxyethyl methacrylate, toluene diisocyanate adduct of β-hydroxyethyl acrylate or β-hydroxyethyl methacrylate, or the like. Meanwhile, the above-exemplified materials may be used alone or in combination.

According to an embodiment of the present disclosure, the separator may have a meltdown temperature of 160° C. or higher.

The separator for a lithium secondary battery may have a meltdown temperature increased as compared to the meltdown temperature of a separator including a non-crosslinked porous polymer substrate. For example, the separator may have a meltdown temperature of 160° C. or higher, 170° C. or higher, or 180-230° C.

As used herein, the term 'separator including a non-crosslinked porous polymer substrate' refers to: a separator including a non-crosslinked and crosslinking structure-free porous polyolefin substrate; a separator including a non-crosslinked and crosslinking structure-free porous polyolefin substrate, and an inorganic composite porous layer disposed on at least one surface of the crosslinking structure-free porous polyolefin substrate and containing an inorganic filler and a binder polymer; or a separator including a non-crosslinked and crosslinking structure-free porous polyolefin substrate, an inorganic composite porous layer disposed on at least one surface of the crosslinking structure-free porous polyolefin substrate and containing an inorganic filler and a first binder polymer, and a porous adhesive layer disposed on the inorganic composite porous layer and containing a second binder polymer.

The meltdown temperature may be determined through thermomechanical analysis (TMA). For example, a sample is taken in each of the machine direction and the transverse direction, and then the sample having a size of width 4.8 mm×length 8 mm is introduced to a TMA instrument (Q400, available from TA Instrument). Then, while a tension of 0.01 N is applied to the sample, the sample is heated to a temperature from 30° C. to 220° C. at a heating rate of 5° C./min, and the temperature where the sample undergoes a rapid increase in length or the sample is broken may be determined as the meltdown temperature.

The separator for a lithium secondary battery according to an embodiment of the present disclosure shows a smaller increase in shutdown temperature, as compared to a separator including a non-crosslinked porous polyolefin substrate, and also provides a small change in shutdown temperature. The separator for a lithium secondary battery according to an embodiment of the present disclosure undergoes a higher increase in meltdown temperature, as compared to a separator including a non-crosslinked porous polyolefin substrate, but shows an insignificant increase in shutdown temperature, and thus can ensure overcharge safety derived from the shutdown temperature, while providing the separator with significantly enhanced high-temperature stability.

According to an embodiment of the present disclosure, the separator for a lithium secondary battery may have a shutdown temperature of 145° C. or lower, 140° C. or lower, or 133-140° C. When the separator for a lithium secondary battery has the above-defined range of shutdown temperature, it is possible to ensure overcharge safety and to prevent the problem of an increase in resistance, caused by damages upon the pores of the porous polyolefin substrate including a crosslinking structure during high-temperature high-pressure processes in the assemblage of a battery.

The shutdown temperature may be determined by measuring the time (sec) required for 100 mL of air to pass through a separator under a constant pressure of 0.05 MPa, when the separator is heated at a rate of 5° C./min, by using an air permeability tester, and determining a temperature where the separator undergoes a rapid increase in air permeability.

The separator according to an embodiment of the present disclosure may have a porosity of 40% or more, 45% or more, or 50% or more.

In addition, the separator according to an embodiment of the present disclosure may satisfy both a meltdown temperature of 160° C. or higher and a porosity of 40% or more. In this case, the separator has excellent high-temperature stability and also ensures a sufficient porosity in a normal operation range, not high temperature, and thus can realize its function as a lithium ion conduction channel advantageously.

Herein, the porosity of the separator may be calculated according to the following formula by taking a specimen having a predetermined area and weighing the specimen:

Porosity (%)=100−[(Weight of separator)/(Area of specimen×Thickness of specimen×Density of separator ingredient)]×100

In addition, the separator according to an embodiment of the present disclosure may have an air permeability of 500 sec/100 mL or less, 200 sec/100 mL or less, 100 sec/100 mL or less, or 79 sec/100 mL or less.

The air permeability (Gurley) may be determined according to ASTM D726-94. Herein, Gurley refers to resistance against air flow and is determined by a Gurley densometer. The air permeability value described herein is expressed by the time (seconds), i.e. air permeation time, required for 100 cc of air to pass through a section of sample substrate having an area of 1 $in^2$ under a pressure of 12.2 in $H_2O$.

The separator for a lithium secondary battery according to an embodiment of the present disclosure may not undergo significant degradation of air permeability, weight per unit area, tensile strength, tensile elongation, puncture strength, electrical resistance, or the like, as compared to the air permeability, weight per unit area, tensile strength, tensile elongation, puncture strength, electrical resistance, or the like, of the separator including a porous polyolefin substrate before crosslinking, and also provides a small change in those properties.

The separator for a lithium secondary battery according to an embodiment of the present disclosure may show a change in air permeability of 10% or less, 0-10%, 0-5%, or 0-3%, as compared to the separator for a lithium secondary battery before crosslinking.

The change in air permeability may be calculated according to the following formula:

Change (%) in air permeability=[(Air permeability of separator for lithium secondary battery after crosslinking)−(Air permeability of separator for lithium secondary battery before crosslinking)]/(Air permeability of separator for lithium secondary battery before crosslinking)×100

The separator for a lithium secondary battery according to an embodiment of the present disclosure may show a change in weight per unit area of 5% or less, or 0-5%, as compared to the separator for a lithium secondary battery before crosslinking.

The change in weight per unit area may be calculated according to the following formula:

Change (%) in weight per unit area=[(Weight per unit area of separator for lithium secondary battery after crosslinking)−(Weight per unit area of separator for lithium secondary battery before crosslinking)]/(Weight per unit area of separator for lithium secondary battery before crosslinking)×100

The weight per unit area ($g/m^2$) is determined by preparing a sample having a width of 1 m and a length of 1 m and measuring the weight of the sample.

The separator for a lithium secondary battery according to an embodiment of the present disclosure shows a change in tensile strength of 20% or less, 0-20%, 0-10%, 0-9%, or 0-7.53%, in each of the machine direction and the transverse direction, as compared to the separator a lithium secondary battery before crosslinking.

The change in tensile strength may be calculated according to the following formula:

Change (%) in tensile strength in machine direction=[(Tensile strength in machine direction of separator for lithium secondary battery before crosslinking)−(Tensile strength in machine direction of separator for lithium secondary battery after crosslinking)]/(Tensile strength in machine direction of separator for lithium secondary battery before crosslinking)×100

Change (%) in tensile strength in transverse direction=[(Tensile strength in transverse direction of separator for lithium secondary battery before crosslinking)−(Tensile strength in transverse direction of separator for lithium secondary battery after crosslinking)]/(Tensile strength in transverse direction of separator for lithium secondary battery before crosslinking)×100

The tensile strength refers to the strength of a specimen at the point of breaking, when the specimen is drawn in each of the machine direction and the transverse direction at a rate of 50 mm/min by using Universal Testing Systems (Instron® 3345) according to ASTM D882.

The separator for a lithium secondary battery according to an embodiment of the present disclosure may show a change in tensile elongation of 20% or less, or 0-20% in each of the machine direction and the transverse direction, as compared to the separator for a lithium secondary battery before crosslinking.

The change in tensile elongation may be calculated according to the following formula:

Change (%) in tensile elongation in machine direction=[(Tensile elongation in machine direction of separator for lithium secondary battery before crosslinking)−(Tensile elongation in machine direction of separator for lithium secondary battery after crosslinking)]/(Tensile elongation in machine direction of separator for lithium secondary battery before crosslinking)×100

Change (%) in tensile elongation in transverse direction=[(Tensile elongation in transverse direction of separator for lithium secondary battery before crosslinking)−(Tensile elongation in transverse direction of separator for lithium secondary battery after crosslinking)]/(Tensile elongation in transverse direction of separator for lithium secondary battery before crosslinking)×100

The tensile elongation can be calculated according to the following formula, after the specimen is drawn in each of the machine direction and the transverse direction at a rate of 50 mm/min by using Universal Testing Systems (Instron® 3345) according to ASTM D882, and the maximum length of the specimen elongated until the specimen is broken is measured.

Tensile elongation (%) in machine direction=(Length of specimen in machine direction right before breaking−Length of specimen in machine direction before elongation)/(Length of specimen in machine direction before elongation)×100

Tensile elongation (%) in transverse direction=(Length of specimen in transverse direction right before breaking−Length of specimen in transverse direction before elongation)/(Length of specimen in transverse direction before elongation)×100

The separator for a lithium secondary battery according to an embodiment of the present disclosure may further include an inorganic composite porous layer disposed on at least one surface of the porous polyolefin substrate and containing an inorganic filler and a binder polymer, as shown in FIG. 1.

Referring to FIG. 1, the separator 1 for a lithium secondary battery according to an embodiment of the present disclosure includes: a polyolefin porous substrate 10; and an inorganic composite porous layer 20 disposed on at least one surface of the porous polyolefin substrate 10 and containing an inorganic filler and a binder polymer.

The inorganic composite porous layer 20 may be formed on one surface or both surfaces of the polyolefin porous substrate 10. The inorganic composite porous layer 20 includes an inorganic filler, and a binder polymer which attaches the inorganic filler particles to one another so that they may retain their binding states (i.e. the binder polymer interconnects and fixes the inorganic filler particles), and the inorganic filler may be bound to the polyolefin porous substrate 10 by the binder polymer. The inorganic composite porous layer 20 prevents the polyolefin porous substrate 10 from undergoing a severe heat shrinking behavior at high temperature by virtue of the inorganic filler to improve the safety of the separator. For example, the separator may show a heat shrinkage of 20% or less, 2-15%, or 2-10% in each of the machine direction and the transverse direction, as determined after allowing the separator to stand at 120° C. for 30 minutes.

As used herein, 'machine direction' refers to the direction of progress during the continuous production of a separator, i.e. the longitudinal direction of the separator, while 'transverse direction' refers to the transverse direction to the machine direction, i.e. the direction perpendicular to the direction of progress during the continuous production of a separator, i.e. the direction perpendicular to the longitudinal direction of the separator.

There is no particular limitation in the inorganic filler, as long as it is electrochemically stable. In other words, there is no particular limitation in the inorganic filler, as long as it causes no oxidation and/or reduction in the range (e.g. 0-5 V based on $Li/Li^+$) of operating voltage of an applicable electrochemical device. Particularly, when using an inorganic filler having a high dielectric constant, it is possible to improve the ion conductivity of an electrolyte by increasing the dissociation degree of an electrolyte salt, such as a lithium salt, in a liquid electrolyte.

For the above-mentioned reasons, the inorganic filler may be an inorganic filler having a dielectric constant of 5 or more, or 10 or more. Non-limiting examples of the inorganic filler having a dielectric constant of 5 or more may include any one selected from the group consisting of $BaTiO_3$, $Pb(Zr,Ti)O_3$ (PZT), $Pb_{1-x}La_xZr_{1-y}Ti_yO_3$ (PLZT, wherein $0<x<1$, $0<y<1$), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, $Mg(OH_2)$, NiO, CaO, ZnO, $ZrO_2$, $SiO_2$, $Y_2O_3$, $Al_2O_3$, AlOOH, $Al(OH)_3$, SiC, $TiO_2$, or a mixture thereof.

According to another embodiment of the present disclosure, the inorganic filler may be an inorganic filler having lithium ion transportability, i.e. inorganic filler containing lithium elements and capable of transporting lithium ions, while not storing lithium. Non-limiting examples of the inorganic filler having lithium ion transportability include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-based glass ($1<x<4$, $0<y<13$), such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), such as $Li_{3.25}Ge_{0.25}P_{0.75}S_4$, lithium nitride ($Li_xN_y$, $0<x<4$, $0<y<2$), such as $Li_3N$, $SiS_2$-based glass ($Li_xSi_yS_z$, $0<x<3$, $0<y<2$, $0<z<4$), such as $Li_3PO_4$—$Li_2S$—$SiS_2$, and $P_2S_5$-based glass ($Li_xP_yS_z$, $0<x<3$, $0<y<3$, $0<z<7$), such as $LiILi_2S$—$P_2S_5$, or a mixture thereof.

According to an embodiment of the present disclosure, the inorganic filler may have an average particle diameter of 0.01-1.5 μm. When the inorganic filler has the above-defined range of average particle diameter, it is possible to form an inorganic composite porous layer 20 having a uniform thickness and suitable porosity and to provide high dispersibility of inorganic filler and desired energy density.

Herein, the average particle diameter of the inorganic filler means $D_{50}$ particle diameter, and "$D_{50}$" means the particle diameter at the point of 50% in the particle number accumulated distribution as a function of particle diameter. The particle diameter may be determined by using the laser diffraction method. Particularly, powder to be analyzed is dispersed in a dispersion medium and introduced to a commercially available laser diffraction particle size analyzer (e.g. Microtrac S3500) to measure a difference in diffraction pattern depending on particle size, when the particles pass through laser beams, and then particle size distribution can be calculated. Then, $D_{50}$ may be determined by calculating the particle diameter at the point of 50% in the particle number accumulated distribution depending on particle diameter in the analyzer system.

The binder polymer may have a glass transition temperature ($T_g$) of −200 to 200° C. When the binder polymer satisfies the above-defined range of glass transition temperature, it can provide the finished inorganic composite porous layer 20 with improved mechanical properties, such as flexibility and elasticity. The binder polymer may have ion conductivity. When the binder polymer has ion conductivity, it is possible to further improve the performance of a battery. The binder polymer may have a dielectric constant ranging from 1.0 to 100 (measured at a frequency of 1 kHz), or from 10 to 100. When the binder polymer has the above-defined range of dielectric constant, it is possible to improve the salt dissociation degree in an electrolyte.

According to an embodiment of the present disclosure, the binder polymer may include polyvinylidene fluoride-co-hexafluoropropylene, polyvinylidene fluoride-co-chlorotrifluoroethylene, polyvinylidene fluoride-co-tetrafluoroethylene, polyvinylidene fluoride-co-trifluoroethylene, polyvinylidene fluoride-co-trichloroethylene, acrylic copolymer, styrene-butadiene copolymer, poly(acrylic acid), polymethyl methacrylate, polybutyl acrylate, polyacrylonitrile, polyvinyl pyrrolidone, polyvinyl alcohol, polyvinyl acetate, polyethylene-co-vinyl acetate, polyethylene oxide, polyacrylate, cellulose acetate, cellulose acetate butyrate, cellulose acetate propionate, cyanoethylpullulan, cyanoethylpolyvinylalchol, cyanoethyl cellulose, cyanoethyl sucrose, pullulan, carboxymethyl cellulose, or two or more of them.

The acrylic copolymer may include, but is not limited to: ethyl acrylate-acrylic acid-N,N-dimethyl acrylamide copolymer, ethyl acrylate-acrylic acid-2-(dimethylamino)ethyl acrylate copolymer, ethyl acrylate-acrylic acid-N,N-diethylacrylamide copolymer, ethyl acrylate-acrylic acid-2-(diethylamino)ethyl acrylate copolymer, or two or more of them.

According to an embodiment of the present disclosure, the weight ratio of the inorganic filler to the binder polymer is determined considering the thickness, pore size and porosity of the finished inorganic composite porous layer 20 and may be 50:50-99.9:0.1, or 60:40-99.5:0.5. When the weight ratio of the inorganic filler to the binder polymer satisfies the above-defined range, it is possible to ensure vacant spaces formed among the inorganic filler particles sufficiently, and thus to ensure the pore size and porosity of the inorganic composite porous layer 20 with ease. In addition, it is possible to ensure the adhesion among the inorganic filler particles with ease.

According to an embodiment of the present disclosure, the inorganic composite porous layer 20 may further include additives, such as a dispersant and/or a thickener. According to an embodiment of the present disclosure, the additives may include polyvinyl pyrrolidone (PVP), hydroxyethyl cellulose (HEC), hydroxypropyl cellulose (HPC), ethylhydroxyethyl cellulose (EHEC), methyl cellulose (MC), carboxymethyl cellulose (CMC), hydroxyalkylmethyl cellulose, cyanoethyl polyvinyl alcohol, or two or more of them.

According to an embodiment of the present disclosure, the inorganic composite porous layer 20 may have a structure in which the inorganic filler particles are bound to one another by the binder polymer, while they are packed in contact with one another. In this manner, interstitial volumes are formed among the inorganic filler particles, and the interstitial volumes become vacant spaces to form pores.

According to another embodiment of the present disclosure, the inorganic composite porous layer 20 may have a structure including: a plurality of nodes including an inorganic filler, and a binder polymer at least partially covering the surface of the inorganic filler; and at least one filament formed from the binder polymer of the nodes in a thread-like shape, wherein the filament has a node-linking portion extended from one node for linking with another node, and the node-linking portion forms a three-dimensional network structure through the filaments derived from the binder polymer and crossing one another.

According to an embodiment of the present disclosure, the inorganic composite porous layer 20 may have an average pore size of 0.001-10 μm. The average pore size of the inorganic composite porous layer 20 may be determined by using the capillary flow porometry. The capillary flow porometry measures the diameter of the smallest pore in the thickness direction. Therefore, in order to determine the average pore size of the inorganic composite porous layer 20 alone by the capillary flow porometry, it is required to separate the inorganic composite porous layer 20 from the polyolefin porous substrate 10, and to surround the separated inorganic composite porous layer 20 with a non-woven web capable of supporting the same. Herein, the non-woven web should have a significantly larger pore size as compare to the pore size of the inorganic composite porous layer 20.

According to an embodiment of the present disclosure, the inorganic composite porous layer 20 may have a porosity of 5-95%, 10-95%, 20-90%, or 30-80%. The porosity corresponds to a value obtained by subtracting the volume expressed from the weight and density of each ingredient in the porous coating layer, from the volume calculated from the thickness, width and length of the porous coating layer.

The porosity and pore size of the inorganic composite porous layer 20 may be determined from scanning electron microscopic (SEM) images, or through the BET 6-point method based on nitrogen gas adsorption flow using a porosimetry analyzer (e.g. Belsorp-II mini, Bell Japan Inc.).

According to an embodiment of the present disclosure, the inorganic composite porous layer 20 may have a thickness of 1.5-5.0 μm on one surface of the polyolefin porous substrate 10. When the thickness of the inorganic composite porous layer 20 satisfies the above-defined range, it is possible to provide high adhesion to an electrode and increased cell strength of a battery.

Figure 2:
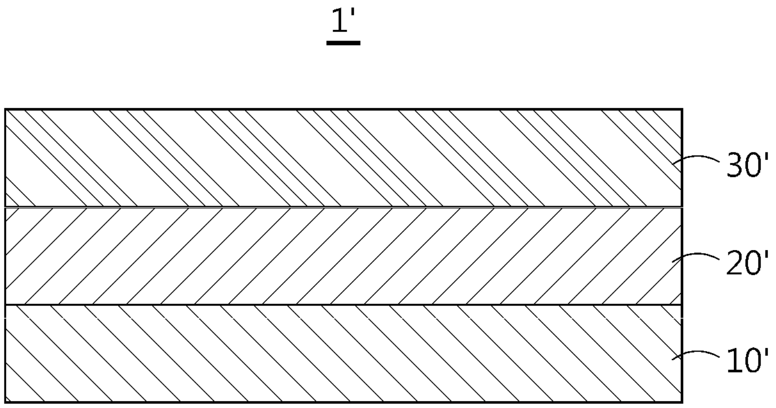
FIG. 2 is a schematic view illustrating the separator for a lithium secondary battery according to an embodiment of the present disclosure.

The separator for a lithium secondary battery according to another embodiment of the present disclosure may further include: an inorganic composite porous layer disposed on at least one surface of the porous polyolefin substrate and containing an inorganic filler and a first binder polymer; and a porous adhesive layer disposed on the inorganic composite porous layer and containing a second binder polymer, as shown in FIG. 2.

Referring to FIG. 2, the separator 1' for a lithium secondary battery according to an embodiment of the present disclosure includes: a polyolefin porous substrate 10' having a crosslinking structure in which polymer chains are linked directly to one another; an inorganic composite porous layer 20' disposed on at least one surface of the porous polyolefin substrate 10 and containing an inorganic filler and a first binder polymer; and a porous adhesive layer 30' disposed on the inorganic composite porous layer 20' and containing a second binder polymer.

The inorganic composite porous layer 20' may be formed on one surface or both surfaces of the polyolefin porous substrate 10'. The inorganic composite porous layer 20' includes an inorganic filler, and a first binder polymer which attaches the inorganic filler particles to one another so that they may retain their binding states (i.e. the first binder polymer interconnects and fixes the inorganic filler particles), and the inorganic filler may be bound to the polyolefin porous substrate 10' by the binder polymer. The inorganic composite porous layer 20' prevents the polyolefin porous substrate 10' from undergoing a severe heat shrinking behavior at high temperature by virtue of the inorganic filler to improve the safety of the separator. For example, the separator may show a heat shrinkage of 20% or less, 2-15%, or 2-10% in each of the machine direction and the transverse direction, as determined after allowing the separator to stand at 120° C. for 30 minutes.

Reference will be made to the above description about the inorganic filler.

The first binder polymer may have a glass transition temperature ($T_g$) of −200 to 200° C. When the first binder polymer satisfies the above-defined range of glass transition temperature, it can provide the finished inorganic composite porous layer 20' with improved mechanical properties, such as flexibility and elasticity. The first binder polymer may have ion conductivity. When the first binder polymer has ion conductivity, it is possible to further improve the performance of a battery. The first binder polymer may have a dielectric constant ranging from 1.0 to 100 (measured at a frequency of 1 kHz), or from 10 to 100. When the first binder polymer has the above-defined range of dielectric constant, it is possible to improve the salt dissociation degree in an electrolyte.

According to an embodiment of the present disclosure, the first binder polymer may be a binder polymer having excellent heat resistance. When the first binder polymer has excellent heat resistance, the inorganic composite porous layer may have further improved heat resistance. For example, the separator may show a heat shrinkage of 20% or less, 2-15%, 2-10%, 2-5%, 0-5%, or 0-2% in each of the machine direction and the transverse direction, as determined after allowing the separator to stand at 150° C. for 30 minutes. According to an embodiment of the present disclosure, the first binder polymer may include acrylic polymer, polyacrylic acid, styrene butadiene rubber, carboxymethyl cellulose, polyvinyl alcohol, or two or more of them.

Particularly, the acrylic polymer may include acrylic homopolymer prepared by polymerizing acrylic monomers alone, or copolymers of acrylic monomers with another monomers. For example, the acrylic polymer may include copolymer of ethylhexyl acrylate with methyl methacrylate, polymethyl methacrylate, polyethylhexyl acrylate, polybutyl acrylate, polyacrylonitrile, copolymer of butyl acrylate with methyl methacrylate, or two or more of them.

According to an embodiment of the present disclosure, the first binder polymer may be a particle-type binder polymer.

According to an embodiment of the present disclosure, the weight ratio of the inorganic filler to the first binder polymer may be 95:5-99.9:0.1, 96:4-99.5:0.5, or 97:3-99:1. When the weight ratio of the inorganic filler to the first binder polymer falls within the above-defined range, a large amount of inorganic filler is distributed per unit area of the separator to provide the separator with improved thermal safety. For example, the separator may show a heat shrinkage of 20% or less, 2-15%, 2-10%, 2-5%, 0-5%, or 0-2% in each of the machine direction and the transverse direction, as determined after allowing the separator to stand at 150° C. for 30 minutes. Hereinafter, the inorganic composite porous layer 20' will be explained with reference to its characteristics different from the characteristics of the above-described inorganic composite porous layer 20.

According to an embodiment of the present disclosure, the inorganic composite porous layer 20' may have a structure in which the inorganic filler particles are bound to one another by the first binder polymer, while they are packed in contact with one another. In this manner, interstitial volumes are formed among the inorganic filler particles, and the interstitial volumes become vacant spaces to form pores.

The porous adhesive layer 30' includes a second binder polymer so that the separator including the inorganic composite porous layer 20' may ensure adhesion to an electrode. In addition, the porous adhesive layer 30' have pores formed therein to prevent an increase in resistance of the separator.

According to an embodiment of the present disclosure, the second binder polymer in the porous adhesive layer 30' cannot infiltrate to the surface and/or inner part of the polyolefin porous substrate 10' to minimize an increase in resistance of the separator.

The second binder polymer may be a binder polymer used conventionally for forming an adhesive layer. The second binder polymer may have a glass transition temperature ($T_g$) of −200 to 200° C. When the second binder polymer satisfies the above-defined range of glass transition temperature, it can provide the finished adhesive layer with improved mechanical properties, such as flexibility and elasticity. The second binder polymer may have ion conductivity. When the second binder polymer has ion conductivity, it is possible to further improve the performance of a battery. The second binder polymer may have a dielectric constant ranging from 1.0 to 100 (measured at a frequency of 1 kHz), or from 10 to 100. When the second binder polymer has the above-defined range of dielectric constant, it is possible to improve the salt dissociation degree in an electrolyte.

According to an embodiment of the present disclosure, the second binder polymer may include polyvinylidene fluoride, polyvinylidene fluoride-co-hexafluoropropylene, polyvinylidene fluoride-co-trichloroethylene, polyvinylidene fluoride-co-tetrafluoroethylene, polyvinylidene fluoride-co-trifluoroethylene, polymethyl methacrylate, polyethylhexyl acrylate, polybutyl acrylate, polyacrylonitrile, polyvinyl pyrrolidone, polyvinyl acetate, polyethylhexyl acrylate-co-methyl methacrylate, polyethylene-co-vinyl acetate, polyethylene oxide, polyacrylate, or two or more of them.

According to an embodiment of the present disclosure, the porous adhesive layer 30' may have a pattern including at least one adhesive region containing the second binder polymer, and at least one non-coated region where no adhesive region is formed. The pattern may have a dot-like, stripe-like, diagonal, waved, triangular, quadrangular or semi-circular shape. When the porous adhesive layer has such a pattern, the separator is improved in terms of resistance, and the non-coated region where no adhesive region is formed allows wetting with an electrolyte to provide the separator with improved electrolyte wettability.

According to an embodiment of the present disclosure, the porous adhesive layer may have a thickness of 0.5-1.5 μm, 0.6-1.2 μm, or 0.6-1.0 μm. When the thickness of the porous adhesive layer falls within the above-defined range, it is possible to provide excellent adhesion to an electrode, resulting in an increase in cell strength of a battery. In addition, such a thickness is favorable in terms of the cycle characteristics and resistance characteristics of a battery.

In another aspect of the present disclosure, there is provided a method for manufacturing a separator for a lithium secondary battery, including the steps of:

(S1) preparing a non-crosslinked porous polyolefin substrate;

(S2) applying a photoinitiator composition including a Type 2 photoinitiator to the non-crosslinked polyolefin porous substrate; and (S3) irradiating the non-crosslinked porous polyolefin substrate having the applied photoinitiator composition, where the irradiation uses ultraviolet (UV) rays.

However, the method for manufacturing a separator for a lithium secondary battery is not limited to the above-mentioned method.

According to the present disclosure, there is provided a crosslinked polyolefin separator having a specific relationship between G' and G" and a specific G' gradient. As described above, the separator having such a relationship and gradient can perform its function as an insulator, while maintaining its strength at high temperature. In other words, even when a lithium secondary battery undergoes a rapid increase in temperature due to an abnormal external environment, the separator can retain its shape, while maintaining a higher level of storage modulus representing solid property as compared to loss modulus representing liquid property, and cannot lose its function as an insulator.

Particularly, first, a non-crosslinked porous polyolefin substrate is prepared.

According to an embodiment of the present disclosure, the non-crosslinked porous polymer substrate in step (S1) may have a BET surface area of 15 $m^2/g$ or more, or 18 $m^2/g$ or more.

The porous polyolefin substrate in step (S1) may have a tan(δ) of 0.5 or more, 0.56 or more, or 0.5-0.56 under the condition of a temperature of 230° C. and an angular frequency of 0.1 rad/s.

The method for manufacturing a separator according to an embodiment of the present disclosure uses UV crosslinking, wherein the crosslinking is performed mainly on the surfaces of fibrils forming polyolefin. In other words, as the specific surface area of the non-crosslinked porous polymer substrate is increased, UV crosslinking may be carried out more effectively.

Particular types of the porous polyolefin substrate that may be used herein are as follows, but are not limited thereto.

According to an embodiment of the present disclosure, the polyolefin may be polyethylene; polypropylene; polybutylene; polypentene; polyhexene; polyoctene; a copolymer of at least two of ethylene, propylene, butene, pentene, 4-methylpentene, hexene, heptene and octene; or a mixture thereof.

Particularly, the polyethylene includes low-density polyethylene (LDPE), linear low-density polyethylene (LLDPE), high-density polyethylene (HDPE), or the like. Among those, high-density polyethylene having a high crystallization degree and a high resin melting point is most preferred.

According to an embodiment of the present disclosure, the polyethylene may have a weight average molecular weight of 200,000-1,000,000, 220,000-700,000, or 250,000-500,000. According to an embodiment of the present disclosure, it is possible to obtain a separator having excellent strength and heat resistance, while ensuring separator film uniformity and film-forming processability, by using polyolefin having a weight average molecular weight of 200,000-1,000,000 as a starting material for manufacturing a separator.

Next, a photoinitiator composition having a Type 2 photoinitiator is applied to the non-crosslinked polyolefin porous substrate.

According to an embodiment of the present disclosure, the Type 2 photoinitiator may include isopropyl thioxanthone (ITX), an isopropyl thioxanthone derivative, thioxanthone (TX), a thioxanthone derivative, benzophenone (BPO), a benzophenone derivative, 4-hydroxybenzophenone, or two or more of them.

As used herein, the term 'derivative' refers to 'derivative in which one hydrogen atom in a benzene ring is substituted with a linear or branched C1-C4 alkyl chain'.

According to an embodiment of the present disclosure, the composition including a Type 2 photoinitiator may be prepared by dissolving the Type 2 photoinitiator in a solvent. The solvent may be acetone, isopropyl alcohol (IPA), N-methyl pyrrolidone (NMP), methyl alcohol, or a mixture of two or more of them. The Type 2 photoinitiator may be present in an amount of 0.01-0.4 wt %, 0.01-0.3 wt %, 0.03-0.3 wt %, or 0.05-0.2 wt % in the composition. When the content of the Type 2 photoinitiator satisfies the above-defined range, it is possible to prevent the problem of shrinking of the separator caused by rapid crosslinking during UV irradiation and to avoid a risk of degradation of mechanical strength caused by the scission of the main chain of polyethylene. Therefore, it is possible to carry out crosslinking suitably with no shrinking caused by crosslinking.

According to an embodiment of the present disclosure, the photoinitiator composition in step (S2) may further include a Type 1 photoinitiator.

For example, the Type 1 photoinitiator may include a benzoin-based initiator, a hydroxyketone-based initiator, an aminoketone-based initiator, a phosphine oxide-based initiator, or two or more of them.

Particularly, the Type 1 photoinitiator may include, but is not limited to: benzoin, benzoin methyl ether, benzoin ethyl ether, benzoin isopropyl ether, benzoin n-butyl ether, benzoin isobutyl ether, acetophenone, dimethylaminoacetophenone, a,a-methoxy-a-hydroxyacetophenone, 2,2-dimethoxy-2-phenylacetophenone, 2,2-diethoxy-2-phenylacetophenone, 2-hydroxy-2-methyl-1-phenylpropan-1-one, 1-hydroxycyclohexylphenyl ketone, 2-methyl-1-[4-(methylthio)phenyl]-2-morpholino-propan-1-one, 4-(2-hydroxyethoxy)phenyl-2-(hydroxy-2-propyl)ketone, benzophenone, 4,4'-diethylaminobenzophenone, dichlorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxantone, 2,4-dimethylthioxanthone, 2,4-diethylthioxanthone, benzyldimethylketal, acetophenone dimethyl ketal, oligo[2-hydroxy-2-methyl-1-[4-(1-methylvinyl)phenyl]propanone], trimethylbenzoyl phenylphosphinate, phenylbis(2,4,6-trimethylbenzoyl)phosphine oxide, or two or more of them.

When the Type 2 photoinitiator composition further includes the Type 1 initiator, UV direct crosslinking may occur more effectively.

In addition, a multifunctional monomer containing an ethylenically unsaturated bond may be further used, in addition to the Type 2 photoinitiator alone, or a combination of a Type 2 photoinitiator with a Type 1 photoinitiator, as mentioned above. Herein, the multifunctional monomer containing an ethylenically unsaturated bond may be used in the composition at a concentration of 0.1-1.0 wt %, 0.2-0.8 wt %, or 0.3-0.6 wt %.

According to an embodiment of the present disclosure, particular methods for applying the composition including the Type 2 photoinitiator (Type 2 photoinitiator composition) to a polyolefin porous substrate may include, but are not limited to: dipping the polyolefin porous substrate in the Type 2 photoinitiator composition, or applying the Type 2 photoinitiator composition to at least one surface of the polyolefin porous substrate through spray drying, or the like. For example, the Type 2 photoinitiator composition may be applied to the polyolefin porous substrate for 0.1 second to 5 minutes, but is not limited thereto. Then, the polyolefin porous substrate coated with the Type 2 photoinitiator composition may be dried. The drying may be carried out at room temperature for 30 seconds to 10 minutes.

Non-limiting examples of the method for coating the polyolefin porous substrate with the photoinitiator solution include dip coating, die coating, roll coating, comma coating, microgravure coating, doctor blade coating, reverse roll coating, Mayer bar coating, direct roll coating, or the like.

After coating the polyolefin porous substrate with the photoinitiator solution, the drying step may be carried out by using a known process, and may be performed in a batch-wise or continuous mode by using an oven or a heating chamber in a temperature range considering the vapor pressure of the solvent used herein. The drying step is for substantially removing the solvent present in the photoinitiator solution, and is preferably carried out as rapidly as possible considering productivity, or the like. For example, the drying step may be carried out for 1 minute or less, or 30 seconds or less.

According to another embodiment of the present disclosure, the photocrosslinking composition may be slurry for forming an inorganic composite porous layer including an inorganic filler, a binder polymer, a Type 2 photoinitiator and a solvent.

When the photocrosslinking composition is slurry for forming an inorganic composite porous layer, the Type 2 photoinitiator is introduced to the surface of the polyolefin porous substrate, while the photocrosslinking composition is coated on the polyolefin porous substrate, and thus the polyolefin porous substrate may be crosslinked upon the irradiation with UV rays, and an inorganic composite porous layer may be formed on at least one surface of the polyolefin porous substrate at the same time. In this manner, it is possible to obtain a lithium secondary battery including a crosslinked structure-containing polyolefin porous substrate, and an inorganic composite porous layer disposed on at least one surface of the crosslinked structure-containing polyolefin porous substrate and including the inorganic filler and binder polymer.

When the slurry for forming an inorganic composite porous layer is used as a photocrosslinking composition, the polyolefin porous substrate may be crosslinked by using a process for forming an inorganic composite porous layer, while avoiding an additional need for a system for applying the Type 2 photoinitiator directly to the polyolefin porous substrate, such as a system for coating and drying the solution including the Type 2 photoinitiator directly on the polyolefin porous substrate.

In addition, the slurry for forming an inorganic composite porous layer does not require any other monomer than the Type 2 photoinitiator in order to crosslink the polymer chains in the polyolefin porous substrate directly. Therefore, even when the Type 2 photoinitiator is incorporated to the slurry for forming an inorganic composite porous layer together with the inorganic filler and binder polymer, there is no monomer or other ingredients interrupting the Type 2 photoinitiator from reaching the surface of the polyolefin porous substrate, and thus the Type 2 photoinitiator can be introduced sufficiently to the surface of the polyolefin porous substrate.

In general, the polyolefin porous polymer substrate itself and the inorganic filler have a high UV-protecting effect. Thus, when UV is irradiated after forming an inorganic composite porous layer containing the inorganic filler, irradiation dose of UV rays arriving at the polyolefin porous substrate may be reduced. However, according to the present disclosure, the polymer chains in the polyolefin porous substrate may be crosslinked directly, even when the UV is irradiated after forming the inorganic composite porous layer.

The solvent may function as a solvent capable of dissolving the binder polymer, or as a dispersion medium not capable of dissolving the binder polymer but capable of dispersing the binder polymer, depending on the type of the binder polymer. In addition, the solvent can dissolve the Type 2 photoinitiator. The solvent may have a solubility parameter similar to the solubility of the binder polymer to be used and a low boiling point. This is because such a solvent allows homogeneous mixing and may be removed with ease subsequently. Non-limiting examples of the solvent are the same as described above.

Reference will be made to the above description about the inorganic filler and the binder polymer.

The binder polymer may be dissolved in the solvent, or may not be dissolved in the solvent but may be dispersed in the solvent, depending on the type of the binder polymer.

According to an embodiment of the present disclosure, when the photocrosslinking composition is the slurry for forming an inorganic composite porous layer, the Type 2 photoinitiator may include isopropyl thioxanthone (ITX), an isopropyl thioxanthone derivative, thioxanthone (TX), benzophenone (BPO), a benzophenone derivative, or two or more of them, and particularly, 2-isopropyl thioxanthone, thioxanthone, 4-hydroxybenzophenone, or a mixture thereof. Particularly, 2-isopropyl thioxanthone or thioxanthone allows photocrosslinking even under a long wavelength showing a high transmission rate. Therefore, even when the slurry for forming an inorganic composite porous layer including an inorganic filler and binder polymer further includes the Type 2 photoinitiator, the polyolefin porous substrate may be crosslinked with ease.

The slurry for forming an inorganic composite porous layer may be prepared by dissolving or dispersing the binder polymer in the solvent, adding the inorganic filler thereto and dispersing it therein. The inorganic filler may be added after it is pulverized in advance to a predetermined average particle diameter. Otherwise, the inorganic filler may be added to the slurry containing the binder polymer dissolved or dispersed therein, and then pulverized and dispersed, while controlling it to have a predetermined average particle diameter by using a ball milling process, or the like. Herein, the pulverization may be carried out for 1-20 hours, and the pulverized inorganic filler may have an average particle diameter within the above-defined range. The inorganic filler may be pulverized by using a conventional method, such as ball milling.

According to an embodiment of the present disclosure, the slurry for forming an inorganic composite porous layer may have a solid content of 5-60 wt %, or 30-50 wt %. When the inorganic composite porous layer has the above-defined range of solid content, it is possible to ensure coating uniformity with ease, and to prevent generation of non-uniformity due to flowing of slurry or to prevent consumption of a lot of energy for drying the slurry.

According to an embodiment of the present disclosure, when the photocrosslinking composition is the slurry for forming an inorganic composite porous layer, a phase separation process may be carried out after coating the photocrosslinking composition on the polyolefin porous substrate. The phase separation may be carried out by humidified phase separation or dipping phase separation.

Hereinafter, humidified phase separation will be explained in more detail.

First, humidified phase separation may be carried out at a temperature of 15-70° C. or 20-50° C. under a relative humidity of 15-80% or 30-50%. While the slurry for forming an inorganic composite porous layer is dried, it has phase transition properties through a vapor-induced phase separation phenomenon.

To carry out humidified phase separation, a non-solvent for the binder polymer may be introduced in a gaseous state. The non-solvent for the binder polymer is not particularly limited, as long as it cannot dissolve the binder polymer and has partial miscibility with the solvent. For example, a non-solvent providing the binder polymer with a solubility of less than 5 wt % at 25° C. may be used. Particular examples of the non-solvent for the binder polymer include water, methanol, ethanol, isopropanol, butanol, ethylene glycol, propylene glycol, tripropylene glycol, or two or more of them.

Hereinafter, dipping phase separation will be explained in more detail.

After coating the slurry for forming an inorganic composite porous layer on the outside of the polyolefin porous substrate, the coated substrate is dipped in a solidifying solution containing a non-solvent for the binder polymer for a predetermined time. In this manner, the binder polymer is solidified, while phase separation occurs in the coated slurry for forming an inorganic composite porous layer. In this process, a porous inorganic composite porous layer is formed. Then, the resultant product is washed with water to remove the solidifying solution, followed by drying. The drying step may be carried out by using a known process, and may be performed in a batchwise or continuous mode by using an oven or a heating chamber in a temperature range considering the vapor pressure of the solvent used herein. The drying step is for substantially removing the solvent present in the slurry, and is preferably carried out as rapidly as possible considering productivity, or the like. For example, the drying step may be carried out for 1 minute or less, or 30 seconds or less.

As the solidifying solution, the non-solvent for the binder polymer may be used alone, or a mixed solvent of the non-solvent for the binder polymer with the above-mentioned solvent may be used. When using a mixed solvent of the non-solvent for the binder polymer with the solvent, the content of the non-solvent for the binder polymer may be 50 wt % or more based on 100 wt % of the solidifying solution with a view to formation of a high-quality porous structure and improvement of productivity.

According to another embodiment of the present disclosure, the step of coating and drying the photocrosslinking composition including the Type 2 photoinitiator and the solvent on the outside of the polyolefin porous substrate may include the following steps of:

coating slurry for forming an inorganic composite porous layer including an inorganic filler, a first binder polymer and a dispersion medium on at least one surface of a polyolefin porous substrate, followed by drying, to form an inorganic composite porous layer; and coating a coating solution for forming a porous adhesive layer including a second binder polymer, Type 2 photoinitiator and a solvent on the top surface of the inorganic composite porous layer, followed by drying.

In this manner, it is possible to obtain a separator for a lithium secondary battery including a crosslinked structure-containing polyolefin porous substrate, an inorganic composite porous layer disposed on at least one surface of the polyolefin porous substrate and including an inorganic filler and a first binder polymer, and a porous adhesive layer including a second binder polymer.

Reference will be made to the above description about the inorganic filler.

The dispersion medium may function as a solvent capable of dissolving the first binder polymer, or as a dispersion medium not capable of dissolving the first binder polymer but capable of dispersing the first binder polymer, depending on the type of the first binder polymer. The dispersion medium may have a solubility parameter similar to the solubility of the first binder polymer to be used and a low boiling point. In this case, the dispersion medium allows homogeneous mixing and may be removed with ease subsequently.

According to an embodiment of the present disclosure, the dispersion medium may be an aqueous dispersion medium. When the dispersion medium is an aqueous dispersion medium, it is eco-friendly, does not require an excessive heat quantity for forming an inorganic composite porous layer and drying, and does not need an additional explosion-preventing system, and thus can form an inorganic composite porous layer more easily.

According to an embodiment of the present disclosure, the first binder polymer may not be dissolved in the solvent and the non-solvent for the second binder polymer as described hereinafter. In this case, even when the coating solution as mentioned hereinafter is applied to form a porous adhesive layer after forming the inorganic composite layer, the first binder polymer is not dissolved, and thus can easily prevent the first binder polymer dissolved in the solvent and/or the non-solvent for the second binder polymer from blocking the pores.

According to an embodiment of the present disclosure, the first binder polymer may be an aqueous binder polymer. Herein, the first binder polymer may be dissolved in an aqueous solvent or may be dispersed by the aqueous dispersion medium. When the first binder polymer is dispersed by the aqueous dispersion medium, the first binder polymer may be a particle-type binder polymer.

Reference will be made to the above description about the slurry for forming an inorganic composite porous layer.

The slurry for forming an inorganic composite porous layer may be dried by a drying method used conventionally for manufacturing a separator. For example, the coated slurry may be dried by using air for 10 seconds to 30 minutes, 30 seconds to 20 minutes, or 3-10 minutes. When the drying time falls within the above-defined range, it is possible to remove the remaining solvent, while not adversely affecting the productivity.

Reference will be made to the above description about the second binder polymer.

The solvent may be one capable of dissolving the second binder polymer at 5 wt % or more, 15 wt % or more, or 25 wt % or more, at 25° C.

The solvent may be a non-solvent for the first binder polymer. For example, the solvent may dissolve the first binder polymer at a concentration of less than 5 wt % at 25° C.

Reference will be made to the above description about the particular types of the solvent.

According to an embodiment of the present disclosure, the second binder polymer may be used in an amount of 3-30 wt %, or 5-25 wt %, based on 100 wt % of the coating solution for forming a porous adhesive layer.

Since the Type 2 photoinitiator is contained in the coating solution for forming a porous adhesive layer, the Type 2 photoinitiator can be introduced to the surface of the polyolefin porous substrate, while forming a porous adhesive layer at the same time, when coating the coating solution for forming a porous adhesive layer on the top surface of the inorganic composite porous layer.

While coating the coating solution for forming a porous adhesive layer, the polyolefin porous substrate is wetted with the solvent. Herein, the Type 2 photoinitiator contained in the coating solution for forming a porous adhesive layer is introduced to the polyolefin porous substrate, and the polyolefin porous substrate may be photocrosslinked by the Type 2 photoinitiator present on the surface of the polyolefin porous substrate upon the UV irradiation.

In this manner, the method for manufacturing a separator for a lithium secondary battery according to an embodiment of the present disclosure can simplify the process in that the polyolefin porous substrate can be photocrosslinked by using a step of forming a porous adhesive layer, while avoiding a need for a system for directly applying the Type 2 photoinitiator to the polyolefin porous substrate in order to photocrosslink the polyolefin porous substrate, for example, a system for directly coating and drying a solution containing the Type 2 photoinitiator on the polyolefin porous substrate.

The method for manufacturing a separator for a lithium secondary battery according to an embodiment of the present disclosure does not require any other ingredient, such as a monomer for forming radicals, than the Type 2 photoinitiator to perform direct crosslinking of the polymer chains in the polyolefin porous substrate. Thus, even though the Type 2 photoinitiator is added to the coating solution for forming a porous adhesive layer, there is no ingredient interrupting the Type 2 photoinitiator from reaching the surface of the polyolefin porous polymer substrate. As a result, the Type 2 photoinitiator can be introduced sufficiently to the surface of the polyolefin porous substrate.

Additionally, in general, the polyolefin porous polymer substrate itself and the inorganic filler have a high UV-protecting effect. Thus, when UV is irradiated after forming an inorganic composite porous layer and porous adhesive layer, irradiation dose of UV rays arriving at the polyolefin porous substrate may be reduced. However, according to the present disclosure, crosslinking may be accomplished even with a low UV irradiation dose, and the polymer chains in the polyolefin porous substrate may be crosslinked directly, even when the UV is irradiated after forming the inorganic composite porous layer and porous adhesive layer.

According to an embodiment of the present disclosure, the coating solution for forming a porous adhesive layer may include, as Type 2 photoinitiator, isopropyl thioxanthone (ITX), an isopropyl thioxanthone derivative, thioxanthone (TX), benzophenone (BPO), a benzophenone derivative, or two or more of them, and particularly, 2-isopropyl thioxanthone, thioxanthone, 4-hydroxybenzophenone, or a mixture thereof. Particularly, 2-isopropyl thioxanthone or thioxanthone allows photocrosslinking even under a long wavelength showing a high transmission rate. Therefore, even when UV is irradiated after forming the inorganic composite porous layer and porous adhesive layer, the polyolefin porous substrate may be crosslinked with ease.

According to an embodiment of the present disclosure, it is possible to form a pattern on the finished porous adhesive layer through the pattern coating of the coating solution for forming a porous adhesive layer on the top surface of the inorganic composite porous layer.

According to an embodiment of the present disclosure, after coating the coating solution for forming a porous adhesive layer on the top surface of the inorganic composite porous layer, phase separation may be carried out. Herein, the phase separation may be carried out by dipping phase separation.

After coating the coating solution for forming a porous adhesive layer on the top surface of the inorganic composite porous layer, the resultant product is dipped in a solidifying solution containing a non-solvent for the second binder polymer for a predetermined time. In this manner, the second binder polymer is solidified, while phase separation occurs in the coated solution for forming a porous adhesive layer. In this process, a porous adhesive layer is formed. Then, the resultant product is washed with water to remove the solidifying solution, followed by drying. The drying step may be carried out by using a known process, and may be performed in a batchwise or continuous mode by using an oven or a heating chamber in a temperature range considering the vapor pressure of the solvent used herein. The drying step is for substantially removing the solvent present in the coating solution for forming a porous adhesive layer, and is preferably carried out as rapidly as possible considering productivity, or the like. For example, the drying step may be carried out for 1 minute or less, or 30 seconds or less.

As the solidifying solution, the non-solvent for the second binder polymer may be used alone, or a mixed solvent of the non-solvent for the second binder polymer with the above-mentioned solvent may be used. When using a mixed solvent of the non-solvent for the second binder polymer with the solvent, the content of the non-solvent for the second binder polymer may be 50 wt % or more based on 100 wt % of the solidifying solution with a view to formation of a high-quality porous structure and improvement of productivity.

While the second binder polymer is solidified, the second binder polymer is condensed. Thus, it is possible to prevent the second binder polymer from infiltrating to the surface and/or inner part of the polyolefin porous substrate, and to prevent an increase in resistance of the separator. In addition, the adhesive layer including the second binder polymer becomes a porous layer to improve the resistance of the separator.

The non-solvent for the second binder polymer may dissolve the second binder polymer at a concentration of less than 5 wt % at 25° C.

The non-solvent for the second binder polymer may also be a non-solvent for the first binder polymer. For example, the non-solvent for the second binder polymer may dissolve the first binder polymer at a concentration of less than 5 wt % at 25° C.

According to an embodiment of the present disclosure, particular examples of the non-solvent for the second binder polymer include water, methanol, ethanol, propyl alcohol, butyl alcohol, butanediol, ethylene glycol, propylene glycol, tripropylene glycol, or two or more of them.

According to an embodiment of the present disclosure, the dipping time may be 3 seconds to 1 minute. When the dipping time satisfies the above-defined range, phase separation occurs suitably to ensure the adhesion between the inorganic composite porous layer and the porous adhesive layer to prevent interlayer separation of the adhesive layer with ease.

According to an embodiment of the present disclosure, the coating solution for forming a porous adhesive layer may be dried by a drying method used conventionally for manufacturing a separator. For example, the coated slurry may be dried by using air for 10 seconds to 30 minutes, 30 seconds to 20 minutes, or 3-10 minutes. When the drying time falls within the above-defined range, it is possible to remove the remaining dispersion medium, while not adversely affecting the productivity As a result, the inorganic composite porous layer and the porous adhesive layer are formed individually through a separate step according to the above-described method, and thus the porous adhesive layer may be formed with various forms. For example, the porous adhesive layer may be formed as a patterned layer with ease.

Then, UV is irradiated to the polyolefin porous substrate coated with the composition.

UV irradiation is carried out by using a UV curing system, while controlling UV irradiation time and irradiation dose adequately considering the content of the photoinitiator, or the like. For example, the UV irradiation time and irradiation dose may be set under such a condition that the polyolefin fibrils may be crosslinked sufficiently to provide the polyolefin porous substrate with a meltdown temperature of 160° C. or more, or 170° C. or more, while preventing the polyolefin porous substrate from being damaged by the heat generated by the UV lamp. In addition, the UV lamp used for the UV curing system may be selected suitably from a high-temperature mercury lamp, a metal lamp, a gallium lamp, or the like, depending on the photoinitiator used herein, and the light emission wavelength and dose of the UV lamp may be selected suitably depending on the process.

According to an embodiment of the present disclosure, UV rays were irradiated to the polyolefin porous substrate coated with the Type 2 photoinitiator composition, wherein the UV light dose may be 10 $mJ/cm^2$ or more, 100 $mJ/cm^2$ or more, or 200 $mJ/cm^2$ or more, and 2000 $mJ/cm^2$ or less, 2200 $mJ/cm^2$ or less, or 2500 $mJ/cm^2$ or less.

According to an embodiment of the present disclosure, 'UV light dose' may be determined by using a portable light dose measuring instrument called UV power puck available from Miltec.

According to the present disclosure, the method for determining 'UV light dose' includes passing UV power puck through a conveyer in the presence of a light source under the same condition as a sample, and the UV light dose value displayed in UV power puck is defined as 'UV light dose'.

Since the fibrils are crosslinked by using a photoinitiator, a high storage modulus can be retained even at high temperature, while showing an insignificant change in loss modulus. In addition, it is known that a general polymer has a gradient of about 2 theoretically, when it follows the Maxwell model, before using a photoinitiator depending on a change in frequency. However, when elasticity is increased rapidly as crosslinking is performed, the gradient changes very gently.

In yet another aspect of the present disclosure, there is provided a lithium secondary battery including a positive electrode, a negative electrode, and the separator according to an embodiment of the present disclosure, interposed between the positive electrode and the negative electrode.

The electrodes, i.e. positive electrode and negative electrode, used in combination with the separator according to the present disclosure are not particularly limited, and may be obtained by allowing electrode active materials to be bound to an electrode current collector through a method generally known in the art. Among the electrode active materials, non-limiting examples of a positive electrode active material include conventional positive electrode active materials that may be used for the positive electrodes for conventional electrochemical devices. Particularly, lithium manganese oxides, lithium cobalt oxides, lithium nickel oxides, lithium iron oxides or lithium composite oxides containing a combination thereof may be used. Particularly, the lithium composite oxide may include $Li[Ni_aCo_bMn_cM1_dM2_e]O_2$ (wherein each of M1 and M2 independently represents any one selected from the group consisting of Al, Ni, Co, Fe, Mn, V, Cr, Ti, W, Ta, Mg and Mo, each of a, b, c, d and e independently represents the atomic fraction of each element forming oxide, and $a \geq 0.5$, $a+b+c+d+e=1$ and $b>d>e$).

Particularly, for example, when the positive electrode active material is nickel (Ni)-rich positive electrode active material having a layered structure, there is an advantage in that the active material can realize a high capacity of 200 mAh/g or more. On the other hand, a positive electrode including such a positive electrode active material shows a low self-heat emitting temperature and is relatively unstable. In the lithium secondary battery according to an embodiment of the present disclosure, when using the above-described separator and the positive electrode including a nickel-rich positive electrode active material at the same time, it is possible to provide the battery with significantly improved safety.

Non-limiting examples of a negative electrode active material include conventional negative electrode active materials that may be used for the negative electrodes for conventional electrochemical devices. Particularly, lithium-intercalating materials, such as lithium metal or lithium alloys, carbon, petroleum coke, activated carbon, graphite or other carbonaceous materials, silicon, silicon oxide, or the like, are used preferably.

Non-limiting examples of a positive electrode current collector include foil made of aluminum, nickel or a combination thereof. Non-limiting examples of a negative electrode current collector include foil made of copper, gold, nickel, copper alloys or a combination thereof.

The electrolyte that may be used in the electrochemical device according to an embodiment of the present disclosure is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone) or a combination thereof. However, the present disclosure is not limited thereto.

MODE FOR DISCLOSURE

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

First, phenylbis(2,4,6-trimethylbenzoyl)phosphine oxide and tris(2-hydroxyethyl)isocyanurate triacrylate (TEICTA) (Sigma-Aldrich), as a Type 1 initiator and thioxanthone (Sigma-Aldrich) as a Type 2 initiator were dissolved in acetone at a concentration of 0.3 wt %, 0.6 wt % and 0.1 wt %, respectively, to prepare a photoinitiator composition.

The photoinitiator composition was applied to a porous polyolefin substrate through dip coating, and then acetone was dried at a temperature of 60° C.

Then, UV was irradiated to the top surface of the porous polyolefin substrate coated with the photoinitiator composition with an accumulated light dose, i.e. UV irradiation light dose of 200 $mJ/cm^2$ (based on UVA), wherein the UV irradiation intensity was set to 80% of the UV light source, and the processing line speed was set to 10 m/min. In this manner, a crosslinked separator for a lithium secondary battery was obtained.

Example 2

First, thioxanthone (Sigma-Aldrich) as a Type 2 initiator was dissolved in acetone at a concentration of 0.1 wt % to prepare a photoinitiator composition.

The photoinitiator composition was applied to a porous polyolefin substrate through dip coating, and then acetone was dried at a temperature of 60° C.

Then, UV was irradiated to the top surface of the porous polyolefin substrate coated with the photoinitiator composition with an accumulated light dose, i.e. UV irradiation light dose of 200 $mJ/cm^2$ (based on UVA), wherein the UV irradiation intensity was set to 80% of the UV light source, and the processing line speed was set to 10 m/min. In this manner, a crosslinked separator for a lithium secondary battery was obtained.

Example 3

A crosslinked separator for a lithium secondary battery was obtained in the same manner as Example 1, except that 4-hydroxybenzophenone (Sigma-Aldrich) as a Type 2 initiator was dissolved in acetone at a concentration of 0.1 wt % to prepare a photoinitiator composition.

Example 4

A crosslinked separator for a lithium secondary battery was obtained in the same manner as Example 1, except that 2-isopropylthioxanthone (Sigma-Aldrich) as a Type 2 initiator was dissolved in acetone at a concentration of 0.1 wt % to prepare a photoinitiator composition.

Comparative Example 1

A polyethylene porous film (Toray, porosity: 51%) having a thickness of 9.6 μm was used as a separator for a lithium secondary battery without any treatment and was taken as Comparative Example 1.

Comparative Example 2

First, phenylbis(2,4,6-trimethylbenzoyl)phosphine oxide and tri s (2-hydroxyethyl)isocyanurate triacrylate (TEICTA) (Sigma-Aldrich), as a Type 1 initiator, and thioxanthone (Sigma-Aldrich) as a Type 2 initiator were dissolved in acetone at a concentration of 0.3 wt %, 0.6 wt % and 0.1 wt %, respectively, to prepare a photoinitiator composition.

The photoinitiator composition was applied to a porous polyolefin substrate through dip coating, and then acetone was dried at a temperature of 60° C. to obtain a separator for a lithium secondary battery. In other words, Comparative Example 2 includes no UV irradiation.

Comparative Example 3

A crosslinked separator for a lithium secondary battery was obtained in the same manner as Example 1, except that phenylbis(2,4,6-trimethylbenzoyl)phosphine oxide and tris (2-hydroxyethyl)isocyanurate triacrylate (TEICTA) (Sigma-Aldrich) as a Type 1 initiator were dissolved in acetone at a concentration of 0.3 wt % and 0.6 wt %, respectively, to prepare a photoinitiator composition.

Comparative Example 4

A crosslinked separator for a lithium secondary battery was obtained in the same manner as Example 1, except that thioxanthone (Sigma-Aldrich) as a Type 2 initiator was dissolved in acetone at a concentration of 2 wt % to prepare a photoinitiator composition.

Comparative Example 5

A crosslinked separator for a lithium secondary battery was obtained in the same manner as Example 3, except that 4-hydroxybenzophenone (Sigma-Aldrich) as a Type 2 initiator was dissolved in acetone at a concentration of 2 wt % to prepare a photoinitiator composition.

Comparative Example 6

A crosslinked separator for a lithium secondary battery was obtained in the same manner as Example 3, except that 4-hydroxybenzophenone (Sigma-Aldrich) as a Type 2 initiator was dissolved in acetone at a concentration of 5 wt % to prepare a photoinitiator composition, and UV was irradiated with a UV irradiation light dose of 1000 $mJ/cm^2$ (based on UVA).

Test Examples

Each of the separators prepared according to Examples 1-4 and Comparative Examples 1-6 was characterized as follows. The results are shown in the following Table 1, Table 2, FIG. 3 and FIG. 4.

Rheological Properties

Each of the separators prepared according to Examples 1-4 and Comparative Examples 1-6 was analyzed through a frequency sweep test at a temperature of 230° C. by using a rheological property analyzer (ARES-G2, available from TA Instruments) to determine the storage modulus G' at a frequency of 0.1 rad/s, loss modulus G" at 1 rad/s and a gradient of storage modulus G' at a frequency of 10-1 to 1 rad/s. Meanwhile, the flowability of each separator can be determined from G' and G". In addition, tan(δ) was calculated by using the following Formula 1:

$$\tan(\delta) = \text{loss modulus } G''/\text{storage modulus } G' \quad \text{[Formula 1]}$$

The storage modulus was determined by using a rheological property analyzer (ARES-G2, TA Instrument). Particularly, the storage modulus was determined by using a rheological property analyzer (ARES-G2, TA Instrument) through a frequency sweep test in a linear viscoelastic regime at a temperature of 230° C. and at a frequency of 0.1 rad/s. However, the whole range of 0.1-100 rad/s was plotted in a graph.

The loss modulus was determined by using a rheological property analyzer (ARES-G2, TA Instrument). Particularly, the loss modulus was determined by using a rheological property analyzer (ARES-G2, TA Instrument) through a frequency sweep test in a linear viscoelastic regime at a temperature of 230° C. and at a frequency of 0.1 rad/s.

Method for Determining Thickness

The thickness of a porous polymer substrate and that of a separator were determined by using a thickness gauge (VL-50S-B, available from Mitutoyo).

Air Permeation Time (Air Permeability)

The air permeation time (air permeability, Gurley) of each of the separators according to Examples 1-4 and Comparative Examples 1-6 was determined according to the method of ASTM D726-94. Gurley used herein refers to the resistance of a separator against air flow and was determined by using Gurley densometer. The air permeability value defined herein is expressed by the time (second), i.e. air permeation time, required for 100 cc of air to pass through the section of 1 $in^2$ of a separator under a pressure of 12.2 in $H_2O$.

Porosity of Separator

The porosity of each of the separators according to Examples 1-4 and Comparative Examples 1-6 was determined by taking a specimen having a predetermined area, measuring the weight thereof, and calculating the porosity according to the following formula:

$$\text{Porosity (\%)} = 100 - [(\text{Weight of separator})/(\text{Area of specimen} \times \text{Thickness of specimen} \times \text{Density of separator ingredient})] \times 100$$

Mechanical Strength (Machine Direction)

Each of the separators according to Examples 1-4 and Comparative Examples 1-6 was cut into a size of 15 mm×100 mm to prepare a specimen. Then, according to ASTM D882, each specimen was drawn in the machine direction (MD) at a rate of 500 mm/min, and the strength at the break point was determined.

Maximum Tensile Load (Machine Direction)

Each of the separators according to Examples 1-4 and Comparative Examples 1-6 was cut into a size of 15 mm×100 mm to prepare a specimen. Then, according to ASTM D882, each specimen was drawn in the machine direction (MD) at a rate of 500 mm/min, and the maximum load applied to the specimen was measured.

Determination of Puncture Strength

The puncture strength was calculated by pushing and breaking each of the separators according to Examples 1-4 and Comparative Examples 1-6 with a needle having a diameter of 1 mm (radius of curvature 0.5 mm) at a rate of 2 mm/sec to measure the strength, and dividing the strength by the thickness of the separator. To determine the puncture strength, Instron 3342 (available from Instron) was used. The measurement value of puncture strength of each of Examples 1-4 and Comparative Examples 1-6 is shown in the following Table 1 and Table 2.

Weight Per Unit Area

The weight per unit area ($g/m^2$) was evaluated by preparing a sample having a size of width×length of 1 m×1 m from each of the separators according to Examples 1-4 and Comparative Examples 1-6, and measuring the weight of the sample.

Determination of Meltdown Temperature

'Meltdown temperature' means a temperature where a separator is shrunk, extended again and then broken, when a load of 0.01 N is applied to the separator and warmed at a rate of 5° C./min by using a thermomechanical analysis (TMA) instrument. As a TMA instrument, Q400 instrument available from TA Instrument was used. The meltdown temperature of each of the separators according to Examples 1-4 and Comparative Examples 1-6 was measured by using the instrument.

TABLE 1

| | Ex. 1 | Ex. 2 | Ex. 3 | Ex. 4 |
|---|---|---|---|---|
| Types of crosslinking additives of separator | Phenylbis(2,4,6-trimethylbenzoyl) phosphine oxide/ TEICTA/Thioxanthone = 0.3%/0.6%/0.1% | Thioxanthone 0.1% | 4-hydroxybenzophenone 0.1% | 2-isopropylthioxanthone 0.1% |
| UV irradiation condition | 200 mJ/cm$^2$ | 200 mJ/cm$^2$ | 200 mJ/cm$^2$ | 200 mJ/cm$^2$ |

TABLE 1-continued

| | | Ex. 1 | Ex. 2 | Ex. 3 | Ex. 4 |
|---|---|---|---|---|---|
| (based on UVA) | | | | | |
| tan(δ) at 230° C., 0.1 rad/s | — | 0.18 | 0.14 | 0.23 | 0.17 |
| Gradient of log(G') vs log(angular frequency) at 230° C., 0.1 rad/s | — | 0.19 | 0.09 | 0.23 | 0.14 |
| Thickness of separator | μm | 9.7 | 9.6 | 9.6 | 9.6 |
| Air permeability of separator | s/100 mL | 79 | 73 | 74 | 73 |
| Porosity of separator | % | 48 | 51 | 51 | 52 |
| Mechanical strength of separator (MD) | $Kgf/cm^2$ | 1700 | 1680 | 1700 | 1720 |
| Maximum tensile load (MD) | Gf | 2480 | 2420 | 2450 | 2460 |
| Puncture strength | Gf | 248 | 242 | 240 | 252 |
| Weight per unit area | $g/m^2$ | 4.7 | 4.3 | 4.3 | 4.4 |
| Meltdown temperature of separator | ° C. | 204 | 198 | 189 | 192 |
| Remarks | | | | | |

TABLE 2

| | | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| Types of crosslinking additives of separator | | — | Phenylbis (2,4,6-trimethyl benzoyl) phosphine oxide/ TEICTA/ thioxanthone = 0.3%/0.6%/0.1% | Phenylbis (2,4,6-trimethyl benzoyl) phosphine oxide/ TEICTA = 0.3%/0.6% | thioxanthone 2% | 4-hydroxy benzophenone 2% | 4-hydroxy benzophenone 5% |
| UV irradiation condition (based on UVA) | | — | — | 200 $mJ/cm^2$ | 200 $mJ/cm^2$ | 200 $mJ/cm^2$ | 1000 $mJ/cm^2$ |
| tan(δ) at 230° C., 0.1 rad/s | — | 0.63 | 0.56 | 0.33 | 0.35 | 0.38 | 0.63 |
| Gradient of log(G') vs log(angular frequency) at 230° C., 0.1 rad/s | — | 0.35 | 0.34 | 0.30 | 0.34 | 0.35 | 0.63 |
| Thickness of separator | μm | 9.6 | 9.7 | 9.6 | 6.7 | 7.4 | 7.1 |
| Air permeability of separator | s/100 mL | 72 | 79 | 78 | 2000 | 2000 | >100000 |
| Porosity of separator | % | 51 | 48 | 48 | 32 | 39 | 33 |
| Mechanical strength of separator (MD) | $Kgf/cm^2$ | 1780 | 1770 | 1760 | 2120 | 1980 | 1920 |
| Maximum tensile load (MD) | Gf | 2560 | 2570 | 2580 | 2130 | 2200 | 2040 |
| Puncture strength | gf | 263 | 258 | 260 | 238 | 240 | 215 |
| Weight per unit area | $g/m^2$ | 4.3 | 4.7 | 4.7 | 4.3 | 4.3 | 4.5 |
| Meltdown | ° C. | 145 | 145 | 153 | 184 | 178 | 167 |

TABLE 2-continued

| | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| temperature of separator | | | | | | |
| Remarks | Porous polymer substrate itself | No UV treatment | | | | |

Figure 3:
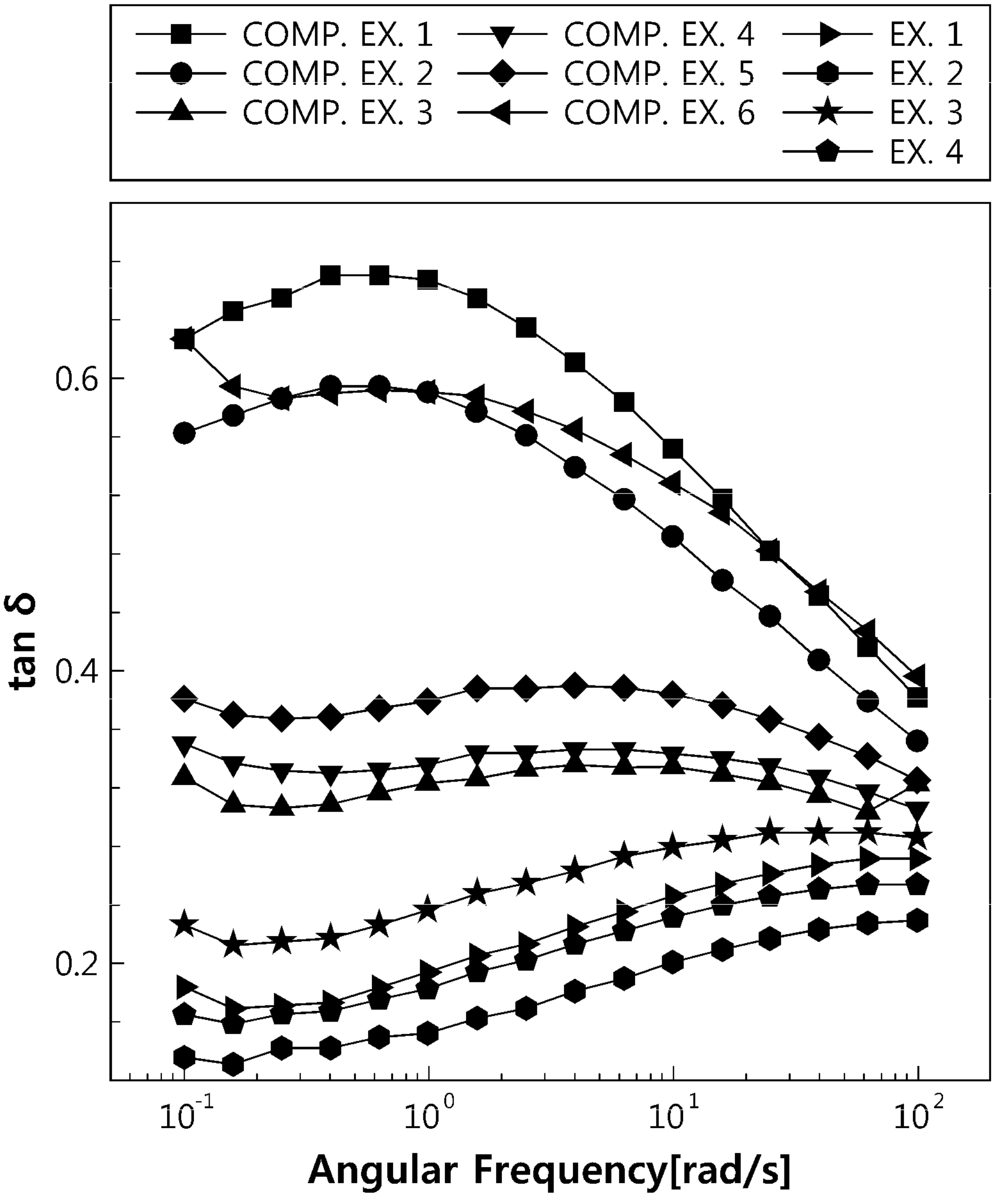
FIG. 3 is a graph illustrating tan(δ) depending on angular frequency of the separator according to each of Examples 1-4 and Comparative Examples 1-6, as determined by Formula 1.
Figure 4:
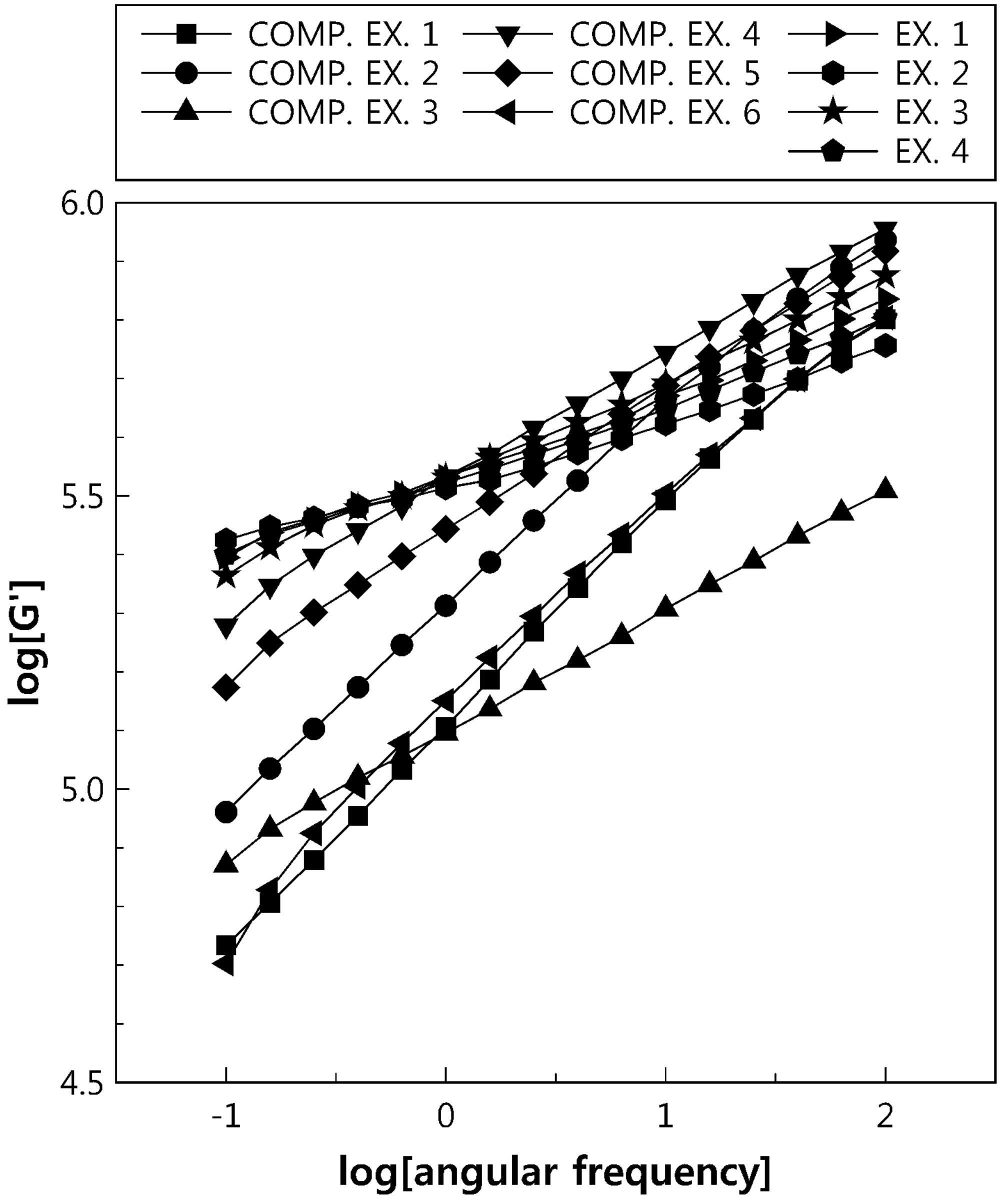
FIG. 4 is a graph illustrating 'a' value (storage modulus converted into a log scale to angular frequency converted into a log scale) of the separator according to each of Examples 1-4 and Comparative Examples 1-6, as determined by Formula 2.

Referring to Table 1, Table 2, FIG. 3 and FIG. 4, in the case of Comparative Example 1 using a porous polymer substrate subjected to no treatment, tan(δ) according to Formula 1 is 0.63, and 'a' according to Formula 2 is 0.35. In this case, the separator shows a significantly low meltdown temperature of 145° C.

On the contrary, when UV direct crosslinking is carried out by using a Type 2 initiator according to Examples 1-4, the separators show a significantly high meltdown temperature of 204° C., 198° C., 189° C. and 192° C., respectively.

Meanwhile, when a Type 2 initiator is used but no UV irradiation is performed according to Comparative Example 2, crosslinking does not occur, and thus the separator shows a significantly low meltdown temperature of 145° C.

In addition, since Comparative Example 3 includes no thioxanthone in the photoinitiator composition, and a low light dose of 200 mJ/cm$^2$ cannot induce crosslinking sufficiently, the separator shows a significantly low meltdown temperature.

Comparative Examples 4 and 5 use 2 wt % of thioxanthone or 4-hydroxybenzophenone alone in the photoinitiator composition, and thus radical reaction occurs excessively to induce not only crosslinking among the polymer chains but also chain cleavage at the same time. As a result, in this case, tan(δ) according to Formula 1 is larger than 0.3, and 'a' according to Formula 2 does not fall within a range of 0.03-0.25. In addition, the pores of the separator are blocked due to the heat generation caused by such excessive reaction, and the separator shows significantly degraded air permeability.

Comparative Example 6 uses 5 wt % of benzophenone in the photoinitiator composition with a light dose increased to 5 times. As a result, chain cleavage observed in Comparative Example 6 occurs more excessively, and heat generation also occurs to cause significant degradation of air permeability, and the separator shows a significantly low meltdown temperature of 167° C.

What is claimed is:

1. A separator for a lithium secondary battery, comprising:

a porous polyolefin substrate having a tan(δ) of 0.3 or less, wherein tan(δ) is determined by Formula 1 at a temperature of 230° C. and an angular frequency of 0.1 rad/s, wherein the porous polyolefin substrate has an 'a' value of 0.03-0.25 as determined by Formula 2 at a temperature of 230° C. and an angular frequency of 0.1 rad/s:

$$\tan(\delta)=G''/G' \quad \{\text{Formula 1}\}$$

$$a=d(\log(G'))/d(\log(\text{angular frequency})) \quad [\text{Formula 2}]$$

wherein G' is a storage modulus of the porous polyolefin substrate and G" is a loss modulus of the porous polyolefin substrate.

2. The separator for a lithium secondary battery according to claim 1, wherein tan(δ) is 0.1 to 0.3.

3. The separator for a lithium secondary battery according to claim 1, wherein 'a' value is 0.04 to 0.23.

4. The separator for a lithium secondary battery according to claim 1, wherein the porous polyolefin substrate comprises a plurality of fibrils and pores, wherein the pores are formed by the fibrils entangling with one another, and wherein polyolefin chains forming the fibrils are crosslinked directly with one another.

5. The separator for a lithium secondary battery according to claim 4, wherein the surfaces of fibrils are crosslinked.

6. The separator for a lithium secondary battery according to claim 1, wherein G' is 1.0×10$^5$ to 1.0×10$^7$ Pa.

7. The separator for a lithium secondary battery according to claim 1, wherein G" is 1.0×10$^6$ Pa or less.

8. The separator for a lithium secondary battery according to claim 1, wherein the separator has a melt-down temperature of 160° C. or higher.

9. The separator for a lithium secondary battery according to claim 1, wherein the separator has a porosity of 40% or more.

10. The separator for a lithium secondary battery according to claim 1, wherein the separator has an air permeability of 500 sec/100 mL or less.

11. The separator for a lithium secondary battery according to claim 1, further comprising:

an inorganic composite porous layer disposed on at least one surface of the porous polyolefin substrate, wherein the inorganic composite porous layer comprises an inorganic filler and a binder polymer.

12. The separator for a lithium secondary battery according to claim 1, further comprising:

an inorganic composite porous layer disposed on at least one surface of the porous polyolefin substrate, wherein the inorganic composite porous layer comprises an inorganic filler and a first binder polymer; and a porous adhesive layer disposed on the inorganic composite porous layer, wherein the porous adhesive layer comprises a second binder polymer.

13. A method for manufacturing the separator for a lithium secondary battery of claim 1, comprising the steps of:

(S1) preparing a non-crosslinked porous polyolefin substrate;

(S2) applying a photoinitiator composition to the non-crosslinked polyolefin porous substrate, wherein the photoinitiator composition comprises a Type 2 photoinitiator; and (S3) irradiating the porous polyolefin substrate having the applied photoinitiator composition, wherein the irradiation uses ultraviolet (UV) rays.

14. The method for manufacturing the separator for a lithium secondary battery according to claim 13, wherein the non-crosslinked porous polymer substrate in step (S1) has a BET specific surface area of 15 m$^2$/g or more.

15. The method for manufacturing the separator for a lithium secondary battery according to claim 13, wherein the non-crosslinked porous polyolefin substrate of step (S1) has a tan(δ) of 0.5 or more, as determined by Formula 1 at a temperature of 230° C. and an angular frequency of 0.1 rad/s.

16. The method for manufacturing the separator for a lithium secondary battery according to claim 13, wherein the Type 2 photoinitiator comprises isopropyl thioxanthone (ITX), an isopropyl thioxanthone derivative, thioxanthone (TX), benzophenone (BPO), a benzophenone derivative, 4-hydroxybenzophenone, or combinations thereof.

17. The method for manufacturing the separator for a lithium secondary battery according to claim 13, wherein the concentration of the Type 2 photoinitiator is 0.01 to 0.3 wt % based on the total weight of the photoinitiator composition.

18. The method for manufacturing the separator for a lithium secondary battery according to claim 13, wherein the photoinitiator composition in step (S2) further comprises a Type 1 photoinitiator, and wherein the Type 1 photoinitiator comprises a benzoin-based initiator, a hydroxyketone-based initiator, an aminoketone-based initiator, a phosphine oxide-based initiator, or combinations thereof.

19. A lithium secondary battery, comprising:

a positive electrode;

a negative electrode; and the separator of claim 1 interposed between the positive electrode and the negative electrode.

* * * * *